(12) United States Patent
Raghavan et al.

(10) Patent No.: US 7,128,684 B2
(45) Date of Patent: Oct. 31, 2006

(54) PLANETARY TRANSMISSIONS HAVING A STATIONARY FIXED INTERCONNECTION AND UP TO THREE INPUT CLUTCHES

(75) Inventors: Madhusudan Raghavan, West Bloomfield, MI (US); Norman K. Bucknor, Troy, MI (US); Patrick B. Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 178 days.

(21) Appl. No.: 10/978,990

(22) Filed: Nov. 1, 2004

(65) Prior Publication Data

US 2006/0094561 A1  May 4, 2006

(51) Int. Cl.
*F16H 3/44* (2006.01)
*F16H 37/06* (2006.01)

(52) U.S. Cl. .............. 475/296; 475/276; 475/280; 475/330

(58) Field of Classification Search ............. 475/296, 475/276, 280, 282, 284, 286, 311, 313, 317, 475/319, 323, 325, 330
See application file for complete search history.

(56) References Cited

U.S. PATENT DOCUMENTS

| | | | | |
|---|---|---|---|---|
| 3,274,858 A * | 9/1966 | Jensen et al. | ............... | 475/129 |
| 3,298,252 A * | 1/1967 | Malm et al. | ............... | 475/279 |
| 3,956,946 A * | 5/1976 | Murakami et al. | .......... | 475/276 |
| 4,038,887 A * | 8/1977 | Murakami et al. | .......... | 475/276 |
| 4,070,927 A | 1/1978 | Polak | ........................ | 475/286 |
| 4,395,925 A * | 8/1983 | Gaus | ........................... | 475/278 |
| 4,660,439 A * | 4/1987 | Hiraiwa | ..................... | 475/276 |
| 4,709,594 A | 12/1987 | Maeda | ........................ | 475/280 |
| 5,106,352 A | 4/1992 | Lepelletier | ................... | 475/280 |
| 5,133,697 A * | 7/1992 | Hattori | ........................ | 475/276 |
| 5,385,064 A | 1/1995 | Reece | .......................... | 74/331 |
| 5,497,867 A | 3/1996 | Hirsch et al. | ............ | 192/48.91 |
| 5,560,461 A | 10/1996 | Loeffler | ..................... | 192/53.32 |
| 5,599,251 A | 2/1997 | Beim et al. | ................. | 475/275 |
| 5,641,045 A | 6/1997 | Ogawa et al. | ......... | 192/53.341 |
| 5,651,435 A | 7/1997 | Perosky et al. | ............ | 192/219 |
| 5,975,263 A | 11/1999 | Forsyth | ..................... | 192/53.32 |
| 6,053,839 A | 4/2000 | Baldwin et al. | ............ | 475/281 |
| 6,071,208 A | 6/2000 | Koivunen | ..................... | 475/275 |
| 6,083,135 A | 7/2000 | Baldwin et al. | ............ | 475/276 |
| 6,217,474 B1 | 4/2001 | Ross et al. | ................... | 475/269 |
| 6,231,471 B1 * | 5/2001 | Park | .......................... | 475/325 |
| 6,354,416 B1 | 3/2002 | Eo | ........................ | 192/53.341 |

(Continued)

FOREIGN PATENT DOCUMENTS

JP  09-126283  5/1997

*Primary Examiner*—Tisha Lewis
(74) *Attorney, Agent, or Firm*—Kathryn A. Marra

(57) ABSTRACT

The family of transmissions has a plurality of members that can be utilized in powertrains to provide at least eight forward torque ratios and one reverse speed ratio. The transmission family members include three planetary gear sets having seven torque-transmitting mechanisms, and two interconnecting members, one of which is grounded. The powertrain includes an engine that is selectively connectable to at least one of the planetary gear members and an output member that is continuously connected with another one of the planetary gear members. The seven torque-transmitting mechanisms provide interconnections between various gear members, the input shaft and the transmission housing, and are operated in combinations of three to establish at least eight forward torque ratios and at least one reverse speed ratio.

15 Claims, 13 Drawing Sheets

U.S. PATENT DOCUMENTS

| | | |
|---|---|---|
| 6,375,592 B1 | 4/2002 | Takahashi et al. .......... 475/262 |
| 6,422,969 B1 | 7/2002 | Raghavan et al. .......... 475/276 |
| 6,425,841 B1 | 7/2002 | Haka ......................... 475/275 |
| 6,471,615 B1 | 10/2002 | Naraki et al. ............... 475/262 |
| 6,558,287 B1 | 5/2003 | Hayabuchi et al. ......... 475/271 |
| 6,623,397 B1 | 9/2003 | Raghavan et al. ......... 360/96.5 |
| 6,752,738 B1 * | 6/2004 | Martin et al. ............... 475/276 |
| 6,767,304 B1 * | 7/2004 | Botosan et al. ............. 475/132 |

* cited by examiner

| | RATIOS | 50 | 52 | 54 | 56 | 57 | 58 | 59 |
|---|---|---|---|---|---|---|---|---|
| REVERSE | -2.27 | | | X | X | | | X |
| NEUTRAL | 0.00 | | | X | X | | | |
| 1' | 6.29 | X | | | | X | X | |
| 1 | 4.99 | X | | X | X | | | |
| 2 | 3.00 | X | | | X | | X | |
| 3 | 2.10 | | | X | X | | X | |
| 3' | 2.03 | X | | | X | X | | |
| 4 | 1.33 | | X | | X | | X | |
| 5 | 1.00 | | X | X | X | | | |
| 6 | 0.90 | | X | | X | X | | |
| 7 | 0.77 | X | X | | | X | | |
| 8 | 0.69 | | X | | | X | X | |
| 8' | 0.67 | | | X | X | X | | |

(X = ENGAGED CLUTCH)

$\frac{\text{RING GEAR}}{\text{SUN GEAR}}$ TOOTH RATIO: $\frac{N_{R_1}}{N_{S_1}} = 2.00$, $\frac{N_{R_2}}{N_{S_2}} = 2.99$, $\frac{N_{R_3}}{N_{S_3}} = 2.28$

| RATIO SPREAD | 7.23 |
|---|---|
| RATIO STEPS | |
| REV/1 | -0.45 |
| 1/2 | 1.66 |
| 2/3 | 1.43 |
| 3/4 | 1.58 |
| 4/5 | 1.33 |
| 5/6 | 1.11 |
| 6/7 | 1.17 |
| 7/8 | 1.12 |

| | RATIOS | 150 | 152 | 154 | 156 | 157 | 158 | 159 |
|---|---|---|---|---|---|---|---|---|
| REVERSE | -2.91 | | | X | X | | | X |
| NEUTRAL | 0.00 | X | | | | | X | |
| 1 | 4.59 | X | | | | X | X | |
| 2 | 2.75 | X | | X | | | X | |
| 3 | 1.67 | X | | | X | | X | |
| 4 | 1.45 | | X | | X | | X | |
| 5 | 1.22 | X | | X | X | | | |
| 6' | 1.04 | X | | | X | X | | |
| 6 | 1.00 | | X | X | X | | | |
| 7 | 0.90 | | X | | X | X | | |
| 7' | 0.88 | X | X | | | X | | |
| 8 | 0.74 | | X | | | X | | X |
| 8' | 0.62 | | | X | X | X | | |

(X = ENGAGED CLUTCH)

$\dfrac{\text{RING GEAR}}{\text{SUN GEAR}}$ TOOTH RATIO: $\dfrac{N_{R1}}{N_{S1}} = 1.50$, $\dfrac{N_{R2}}{N_{S2}} = 2.24$, $\dfrac{N_{R3}}{N_{S3}} = 2.91$

| RATIO SPREAD | 6.20 |
|---|---|
| RATIO STEPS | |
| REV/1 | -0.63 |
| 1/2 | 1.67 |
| 2/3 | 1.65 |
| 3/4 | 1.14 |
| 4/5 | 1.19 |
| 5/6 | 1.22 |
| 6/7 | 1.11 |
| 7/8 | 1.22 |

| | RATIOS | 250 | 252 | 254 | 256 | 257 | 258 | 259 |
|---|---|---|---|---|---|---|---|---|
| REVERSE' | -26.19 | X | | X | | X | | |
| REVERSE | -8.05 | | X | X | | X | | |
| NEUTRAL | 0.00 | X | | | | | | X |
| 1 | 7.93 | X | | | | | X | X |
| 2 | 4.81 | X | | | | X | | X |
| 3 | 3.25 | X | | | X | | | X |
| 4 | 2.44 | X | | X | | | | X |
| 5' | 1.75 | | X | X | X | | | |
| 5 | 1.48 | X | X | | | | | X |
| 6 | 1.00 | X | X | X | | | | |
| 7 | 0.74 | X | X | | | | X | |
| 8 | 0.67 | | X | X | | | X | |

(X = ENGAGED CLUTCH)

$\frac{\text{RING GEAR}}{\text{SUN GEAR}}$ TOOTH RATIO: $\frac{N_{R1}}{N_{S1}} = 2.25$, $\frac{N_{R2}}{N_{S2}} = 2.09$, $\frac{N_{R3}}{N_{S3}} = 2.00$

| RATIO SPREAD | 11.84 |
|---|---|
| RATIO STEPS | |
| REV/1 | -1.02 |
| 1/2 | 1.65 |
| 2/3 | 1.48 |
| 3/4 | 1.33 |
| 4/5 | 1.65 |
| 5/6 | 1.48 |
| 6/7 | 1.35 |
| 7/8 | 1.10 |

| | RATIOS | 350 | 352 | 354 | 356 | 357 | 358 | 359 |
|---|---|---|---|---|---|---|---|---|
| REVERSE | -6.25 | X | | | | X | | X |
| REVERSE' | -3.76 | X | | | X | | | X |
| REVERSE" | -2.50 | X | X | | | | | X |
| NEUTRAL | 0.00 | X | | | | | X | |
| 1 | 4.16 | X | | | | X | X | |
| 2 | 2.50 | X | | | X | | X | |
| 3 | 1.66 | X | X | | | | X | |
| 4 | 1.00 | X | | X | | | X | |
| 5 | 0.79 | X | X | X | | | | |
| 6 | 0.71 | X | | X | X | | | |
| 7 | 0.66 | X | | X | | X | | |
| 8 | 0.60 | | | X | X | X | | |

(X = ENGAGED CLUTCH)

$\underline{\text{RING GEAR}}$ TOOTH RATIO: $\frac{N_{R1}}{N_{S1}} = 1.50$, $\frac{N_{R2}}{N_{S2}} = 1.51$, $\frac{N_{R3}}{N_{S3}} = 1.50$
SUN GEAR

| RATIO SPREAD | 6.93 |
|---|---|
| RATIO STEPS | |
| REV/1 | -1.50 |
| 1/2 | 1.66 |
| 2/3 | 1.51 |
| 3/4 | 1.66 |
| 4/5 | 1.27 |
| 5/6 | 1.11 |
| 6/7 | 1.08 |
| 7/8 | 1.10 |

|   | RATIOS | 450 | 452 | 454 | 456 | 457 | 458 | 459 |
|---|---|---|---|---|---|---|---|---|
| REVERSE | -6.25 | X |   |   |   | X |   | X |
| REVERSE' | -3.76 | X |   |   | X |   |   | X |
| REVERSE" | -2.50 | X |   | X |   |   |   | X |
| NEUTRAL | 0.00 | X |   |   |   |   | X |   |
| 1 | 4.16 | X |   |   |   | X | X |   |
| 2 | 2.50 | X |   |   | X |   | X |   |
| 3 | 1.66 | X |   | X |   |   | X |   |
| 4 | 1.00 | X | X |   |   |   | X |   |
| 5 | 0.79 | X | X | X |   |   |   |   |
| 6 | 0.71 | X | X |   | X |   |   |   |
| 7 | 0.66 | X | X |   |   | X |   |   |
| 8 | 0.60 |   | X | X |   | X |   |   |

(X = ENGAGED CLUTCH)

$\underline{\text{RING GEAR}}{\text{SUN GEAR}}$ TOOTH RATIO: $\frac{N_{R1}}{N_{S1}} = 1.50$, $\frac{N_{R2}}{N_{S2}} = 1.51$, $\frac{N_{R3}}{N_{S3}} = 1.50$

| RATIO SPREAD | 6.93 |
|---|---|
| RATIO STEPS |   |
| REV/1 | -1.50 |
| 1/2 | 1.66 |
| 2/3 | 1.51 |
| 3/4 | 1.66 |
| 4/5 | 1.27 |
| 5/6 | 1.11 |
| 6/7 | 1.08 |
| 7/8 | 1.10 |

| | RATIOS | 550 | 552 | 554 | 556 | 557 | 558 | 559 |
|---|---|---|---|---|---|---|---|---|
| REVERSE | -8.26 | | X | | X | | | X |
| REVERSE' | -4.97 | | X | | | X | | X |
| REVERSE" | -2.99 | X | | | | X | | X |
| NEUTRAL | 0.00 | | X | | | | X | |
| 1 | 5.50 | | X | | X | | X | |
| 2 | 3.31 | X | | | X | | X | |
| 3 | 1.99 | X | | | | X | X | |
| 4 | 1.00 | X | | X | | | X | |
| 5 | 0.75 | X | | X | | X | | |
| 6 | 0.68 | X | | X | X | | | |
| 7 | 0.65 | | X | X | X | | | |
| 8 | 0.60 | | | X | X | X | | |

(X = ENGAGED CLUTCH)

$\underline{\text{RING GEAR}}$ TOOTH RATIO: $\frac{N_{R1}}{N_{S1}} = 1.51$, $\frac{N_{R2}}{N_{S2}} = 2.31$, $\frac{N_{R3}}{N_{S3}} = 1.50$
SUN GEAR

| RATIO SPREAD | 9.17 |
|---|---|
| RATIO STEPS | |
| REV/1 | -1.50 |
| 1/2 | 1.66 |
| 2/3 | 1.66 |
| 3/4 | 1.99 |
| 4/5 | 1.33 |
| 5/6 | 1.10 |
| 6/7 | 1.05 |
| 7/8 | 1.08 |

| | RATIOS | 650 | 652 | 654 | 656 | 657 | 658 | 659 |
|---|---|---|---|---|---|---|---|---|
| REVERSE | -1.81 | | | X | X | | | X |
| NEUTRAL | 0.00 | | | | | X | X | |
| 1 | 3.43 | X | | | | X | X | |
| 2 | 2.20 | X | | X | | | X | |
| 3 | 1.56 | X | | | X | | X | |
| 4 | 1.15 | X | | X | X | | | |
| 5' | 1.00 | X | X | | | | X | |
| 5 | 0.94 | X | | | X | X | | |
| 6 | 0.60 | | X | | X | X | | |
| 7 | 0.54 | X | X | | | X | | |
| 8 | 0.45 | | X | | | X | | X |

(X = ENGAGED CLUTCH)

$\dfrac{\text{RING GEAR}}{\text{SUN GEAR}}$ TOOTH RATIO: $\dfrac{N_{R1}}{N_{S1}} = 1.80$, $\dfrac{N_{R2}}{N_{S2}} = 1.51$, $\dfrac{N_{R3}}{N_{S3}} = 3.02$

| RATIO SPREAD | 7.62 |
|---|---|
| RATIO STEPS | |
| REV/1 | -0.53 |
| 1/2 | 1.56 |
| 2/3 | 1.41 |
| 3/4 | 1.36 |
| 4/5 | 1.22 |
| 5/6 | 1.57 |
| 6/7 | 1.11 |
| 7/8 | 1.20 |

| RATIOS | | 750 | 752 | 754 | 756 | 757 | 758 | 759 |
|---|---|---|---|---|---|---|---|---|
| REVERSE | -3.01 | | X | | | | X | X |
| NEUTRAL | 0.00 | | X | | | | X | |
| 1 | 7.15 | X | X | | | | X | |
| 2 | 4.02 | X | X | | X | | | |
| 3' | 2.82 | X | | | | X | X | |
| 3 | 2.71 | | X | | X | | X | |
| 4 | 1.43 | | X | | X | X | | |
| 5 | 1.11 | | | X | X | X | | |
| 6 | 1.00 | | X | X | | X | | |
| 7 | 0.82 | X | | X | | X | | |
| 8 | 0.75 | | | X | | X | | X |

(X = ENGAGED CLUTCH)

$\frac{\text{RING GEAR}}{\text{SUN GEAR}}$ TOOTH RATIO: $\frac{N_{R1}}{N_{S1}} = 1.82$, $\frac{N_{R2}}{N_{S2}} = 2.34$, $\frac{N_{R3}}{N_{S3}} = 3.00$

| RATIO SPREAD | 9.53 |
|---|---|
| RATIO STEPS | |
| REV/1 | -0.42 |
| 1/2 | 1.78 |
| 2/3 | 1.48 |
| 3/4 | 1.90 |
| 4/5 | 1.29 |
| 5/6 | 1.22 |
| 6/7 | 1.09 |
| 7/8 | 1.20 |

| RATIOS | | 850 | 852 | 854 | 856 | 857 | 858 | 859 |
|---|---|---|---|---|---|---|---|---|
| REVERSE | -3.02 | | | X | X | | | X |
| NEUTRAL | 0.00 | X | | | | | X | |
| 1 | 5.70 | X | | | | X | X | |
| 2 | 3.66 | X | | X | | | X | |
| 3 | 2.59 | X | | | X | | X | |
| 4 | 1.91 | X | | X | X | | | |
| 5' | 1.66 | | X | | X | | X | |
| 5 | 1.56 | X | | | X | X | | |
| 6 | 1.00 | | X | | X | X | | |
| 7 | 0.89 | X | X | | | X | | |
| 8 | 0.75 | | X | | | X | | X |

(X = ENGAGED CLUTCH)

$\dfrac{\text{RING GEAR}}{\text{SUN GEAR}}$ TOOTH RATIO: $\dfrac{N_{R1}}{N_{S1}} = 1.80$, $\dfrac{N_{R2}}{N_{S2}} = 1.51$, $\dfrac{N_{R3}}{N_{S3}} = 3.02$

| RATIO SPREAD | 7.60 |
|---|---|
| RATIO STEPS | |
| REV/1 | -0.53 |
| 1/2 | 1.56 |
| 2/3 | 1.41 |
| 3/4 | 1.36 |
| 4/5 | 1.22 |
| 5/6 | 1.56 |
| 6/7 | 1.12 |
| 7/8 | 1.19 |

| | RATIOS | 950 | 952 | 954 | 956 | 957 | 958 | 959 |
|---|---|---|---|---|---|---|---|---|
| REVERSE | -2.63 | | X | X | | | | X |
| REVERSE' | -1.05 | | X | | | X | | X |
| NEUTRAL | 0.00 | | X | | X | | | |
| 1 | 5.20 | | X | | X | X | | |
| 2 | 3.62 | | X | X | X | | | |
| 3 | 2.50 | X | X | | X | | | |
| 4 | 1.75 | X | X | X | | | | |
| 5 | 1.45 | X | | X | | | X | |
| 6 | 1.00 | X | X | | | | X | |
| 7 | 0.82 | X | | | | X | X | |
| 8 | 0.70 | X | X | | | X | | |

(X = ENGAGED CLUTCH)

$\dfrac{\text{RING GEAR}}{\text{SUN GEAR}}$ TOOTH RATIO: $\dfrac{N_{R1}}{N_{S1}} = 1.50$, $\dfrac{N_{R2}}{N_{S2}} = 2.34$, $\dfrac{N_{R3}}{N_{S3}} = 1.50$

| RATIO SPREAD | 7.43 |
|---|---|
| RATIO STEPS | |
| REV/1 | -0.51 |
| 1/2 | 1.44 |
| 2/3 | 1.45 |
| 3/4 | 1.43 |
| 4/5 | 1.21 |
| 5/6 | 1.45 |
| 6/7 | 1.22 |
| 7/8 | 1.17 |

| | RATIOS | 1150 | 1152 | 1154 | 1156 | 1157 | 1158 | 1159 |
|---|---|---|---|---|---|---|---|---|
| REVERSE | -7.18 | X | | | | X | | X |
| REVERSE' | -5.00 | | X | | | X | | X |
| REVERSE" | -2.17 | X | | | X | | | X |
| NEUTRAL | 0.00 | X | | | | | | X |
| 1 | 4.78 | X | | | | X | X | |
| 2 | 3.31 | X | X | | | | X | |
| 3 | 1.44 | X | | | X | | X | |
| 4 | 1.00 | X | | X | | | X | |
| 5 | 0.83 | X | | X | X | | | |
| 6 | 0.68 | X | X | X | | | | |
| 7 | 0.66 | X | | X | | X | | |
| 8 | 0.60 | | | X | X | X | | |

(X = ENGAGED CLUTCH)

$\frac{\text{RING GEAR}}{\text{SUN GEAR}}$ TOOTH RATIO: $\frac{N_{R1}}{N_{S1}} = 2.25$, $\frac{N_{R2}}{N_{S2}} = 2.31$, $\frac{N_{R3}}{N_{S3}} = 1.50$

| RATIO SPREAD | 7.97 |
|---|---|
| RATIO STEPS | |
| REV/1 | -1.50 |
| 1/2 | 1.44 |
| 2/3 | 2.30 |
| 3/4 | 1.44 |
| 4/5 | 1.20 |
| 5/6 | 1.22 |
| 6/7 | 1.03 |
| 7/8 | 1.10 |

| | RATIOS | 1250 | 1252 | 1254 | 1256 | 1257 | 1258 | 1259 |
|---|---|---|---|---|---|---|---|---|
| REVERSE | -7.32 | X | | | X | | | X |
| REVERSE' | -4.87 | X | | | | X | | X |
| REVERSE" | -2.25 | X | | X | | | | X |
| NEUTRAL | 0.00 | X | | | X | | | |
| 1 | 6.29 | X | | | X | | X | |
| 2 | 4.18 | X | | | | X | X | |
| 3 | 1.93 | | X | | | X | X | |
| 4 | 1.29 | | | X | | X | X | |
| 5 | 1.00 | | X | X | | X | | |
| 6 | 0.81 | X | | X | | X | | |
| 7 | 0.76 | X | | X | X | | | |
| 8 | 0.69 | | | X | X | X | | |

(X = ENGAGED CLUTCH)

$\dfrac{\text{RING GEAR}}{\text{SUN GEAR}}$ TOOTH RATIO: $\dfrac{N_{R1}}{N_{S1}} = 2.25$, $\dfrac{N_{R2}}{N_{S2}} = 1.99$, $\dfrac{N_{R3}}{N_{S3}} = 3.25$

| RATIO SPREAD | 9.12 |
|---|---|
| RATIO STEPS | |
| REV/1 | -1.16 |
| 1/2 | 1.50 |
| 2/3 | 2.17 |
| 3/4 | 1.50 |
| 4/5 | 1.29 |
| 5/6 | 1.23 |
| 6/7 | 1.07 |
| 7/8 | 1.10 |

PLANETARY TRANSMISSIONS HAVING A STATIONARY FIXED INTERCONNECTION AND UP TO THREE INPUT CLUTCHES

TECHNICAL FIELD

The present invention relates to a family of power transmissions having three planetary gear sets that are controlled by seven torque-transmitting devices to provide at least eight forward torque ratios and at least one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward torque ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of torque ratios reduces the step size between ratios and therefore improves the shift quality of the transmission by making the ratio interchanges substantially imperceptible to the operator under normal vehicle acceleration.

It has been suggested that the number of forward torque ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward torque ratios, passenger cars are still manufactured with three- and four-speed automatic transmissions and relatively few five or six-speed devices due to the size and complexity of these transmissions.

Seven-speed transmissions are disclosed in U.S. Pat. No. 6,623,397 issued to Raghavan, Bucknor and Usoro. Eight speed transmissions are disclosed in U.S. Pat. No. 6,425,841 issued to Haka. The Haka transmission utilizes three planetary gear sets and six torque transmitting devices, including two brakes and two clutches, to provide eight forward torque ratios and a reverse speed ratio. One of the planetary gear sets is positioned and operated to establish two fixed speed input members for the remaining two planetary gear sets. Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

It is an object of the present invention to provide an improved family of transmissions having three planetary gear sets controlled to provide at least eight forward torque ratios and at least one reverse speed ratio.

In one aspect of the present invention, the family of transmissions has three planetary gear sets, each of which includes a first, second and third member, which members may comprise a sun gear, a ring gear, or a planet carrier assembly member, in any order.

In referring to the first, second and third gear sets in this description and in the claims, these sets may be counted "first" to "third" in any order in the drawings (i.e., left to right, right to left, etc.).

In another aspect of the present invention, the planetary gear sets may be of the single pinion-type or of the double pinion-type.

In yet another aspect of the present invention, a first member of the first planetary gear set is continuously interconnected with a first member of the second planetary gear set and a stationary member (transmission case) through a first interconnecting member.

In a further aspect of the present invention, a second member of the second planetary gear set is continuously connected with a first member of the third planetary gear set through a second interconnecting member.

In yet a further aspect of the invention, each family member incorporates an output shaft which is continuously connected with at least one member of the planetary gear sets, and an input shaft which is not continuously connected with any member of the planetary gear sets but is selectively connectable with at least one member of the planetary gear sets through at least one of seven torque-transmitting mechanisms.

In still a further aspect of the invention, a first torque-transmitting mechanism, such as a clutch, selectively interconnects a member of the first or third planetary gear set with the input shaft.

In another aspect of the invention, a second torque-transmitting mechanism, such as a clutch, selectively interconnects a member of the second or third planetary gear set with the input shaft.

In a still further aspect of the invention, a third torque-transmitting mechanism, such as a clutch, selectively interconnects a member of the first, second or third planetary gear set with the input shaft or with another member of the first, second or third planetary gear set.

In a still further aspect of the invention, a fourth torque-transmitting mechanism, such as a clutch, selectively interconnects a member of the first planetary gear set with a member of the second or third planetary gear set.

In a still further aspect of the invention, a fifth torque-transmitting mechanism, such as a clutch, selectively connects a member of the second planetary gear set with a member of the first or third planetary gear set.

In still another aspect of the invention, a sixth torque-transmitting mechanism, such as a clutch, selectively connects a member of the first, second or third planetary gear set with another member of the first, second or third planetary gear set.

In still another aspect of the invention, a seventh torque-transmitting mechanism, such as a clutch, selectively interconnects a member of the first, second or third planetary gear set with another member of the first, second or third planetary gear set. Alternatively, the seventh torque-transmitting mechanism, such as a brake, selectively connects a member of the first, second or third planetary gear set with the stationary member (transmission case).

In still another aspect of the invention, the seven torque-transmitting mechanisms are selectively engageable in combinations of three to yield at least eight forward torque ratios and at least one reverse speed ratio.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart depicting some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention;

FIG. 7b is a truth table and chart depicting some of the operating characteristics of the powertrain shown in FIG. 7a;

FIG. 8a is a schematic representation of a powertrain having a planetary transmission incorporating another family member of the present invention;

FIG. 8b is a truth table and chart depicting some of the operating characteristics of the powertrain shown in FIG. 8a;

FIG. 9a is a schematic representation of a powertrain having a planetary transmission incorporating another family member of the present invention;

FIG. 9b is a truth table and chart depicting some of the operating characteristics of the powertrain shown in FIG. 9a;

FIG. 10a is a schematic representation of a powertrain having a planetary transmission incorporating another family member of the present invention;

FIG. 10b is a truth table and chart depicting some of the operating characteristics of the powertrain shown in FIG. 10a;

FIG. 11a is a schematic representation of a powertrain having a planetary transmission incorporating another family member of the present invention;

FIG. 11b is a truth table and chart depicting some of the operating characteristics of the powertrain shown in FIG. 11a;

FIG. 12a is a schematic representation of a powertrain having a planetary transmission incorporating another family member of the present invention;

FIG. 12b is a truth table and chart depicting some of the operating characteristics of the powertrain shown in FIG. 12a;

FIG. 13a is a schematic representation of a powertrain having a planetary transmission incorporating another family member of the present invention; and FIG. 13b is a truth table and chart depicting some of the operating characteristics of the powertrain shown in FIG. 13a.

DETAILED DESCRIPTION OF THE PREFERRED EMBODIMENTS

Figures 1A, 1B:
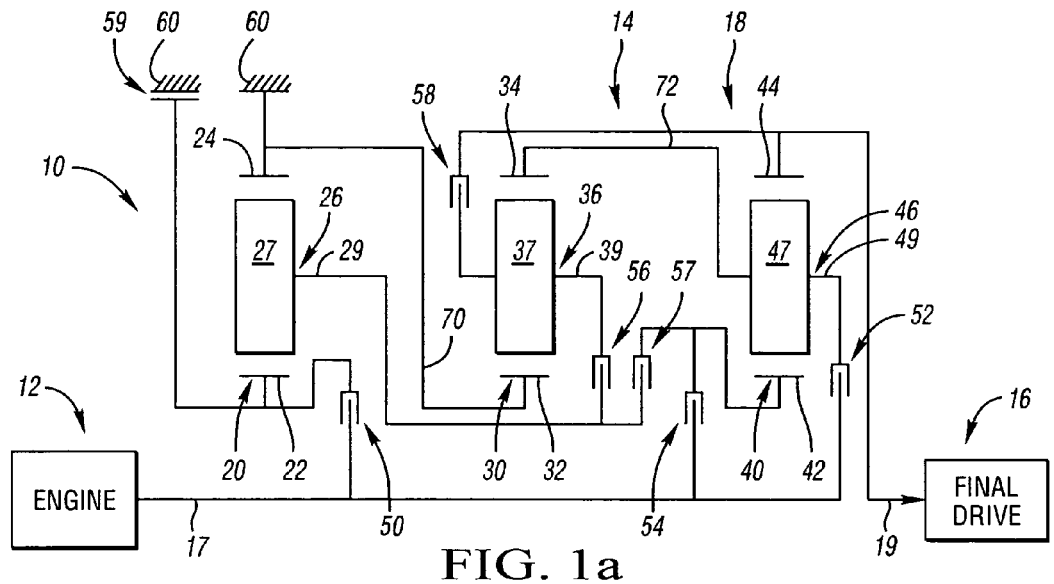

Referring to the drawings, wherein like characters represent the same or corresponding parts throughout the several views, there is shown in FIG. 1a a powertrain 10 having a conventional engine 12, a planetary transmission 14, and a conventional final drive mechanism 16.

The planetary transmission 14 includes an input shaft 17 connected with the engine 12 (the input shaft 17 may be internal or external to the transmission 14), a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly 26. The planet carrier assembly 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear arrangement also includes seven torque-transmitting mechanisms 50, 52, 54, 56, 57, 58 and 59. The torque-transmitting mechanisms 50, 52, 54, 56, 57 and 58 are rotating-type torque-transmitting mechanisms, commonly termed clutches. The torque-transmitting mechanism 59 is a stationary-type torque transmitting mechanism, commonly termed brake or reaction clutch.

The input shaft 17 is not continuously connected with any planetary gear member. The output shaft 19 is continuously connected with the ring gear member 44. The ring gear member 24 is continuously connected with the sun gear member 32 and with the transmission housing 60 through the interconnecting member 70. The ring gear member 34 is continuously connected with the planet carrier assembly member 46 through the interconnecting member 72.

The sun gear member 22 is selectively connectable with the input shaft 17 through the clutch 50. The planet carrier assembly member 46 is selectively connectable with the input shaft 17 through the clutch 52. The sun gear member 42 is selectively connectable with the input shaft 17 through the clutch 54. The planet carrier assembly member 26 is selectively connectable with the planet carrier assembly member 36 through the clutch 56. The planet carrier assembly member 26 is selectively connectable with the sun gear member 42 through the clutch 57. The planet carrier assembly member 36 is selectively connectable with the ring gear member 44 through the clutch 58. The sun gear member 22 is selectively connectable with the transmission housing 60 through the brake 59.

As shown in FIG. 1b, and in particular the truth table disclosed therein, the torque-transmitting mechanisms are selectively engaged in combinations of three to provide eight forward torque ratios and one reverse speed ratio, as well as extra first, third and eighth forward torque ratios.

The reverse speed ratio is established with the engagement of the clutches 54, 56 and the brake 59. The clutch 54 connects the sun gear member 42 with the input shaft 17. The clutch 56 connects the planet carrier assembly member 26 with the planet carrier assembly member 36. The brake 59 connects the sun gear member 22 with the transmission housing 60. The planetary gear sets 20, 30 and planet carrier assembly member 46 do not rotate. The sun gear member 42 rotates at the same speed as the input shaft 17. The ring gear member 44 rotates at the same speed as the output shaft 19. The ring gear member 44, and therefore the output shaft 19, rotates at a speed determined from the speed of the sun gear member 42 and the ring gear/sun gear tooth ratio of the planetary gear set 40. The numerical value of the reverse speed ratio is determined utilizing the ring gear/sun gear tooth ratio of the planetary gear set 40.

The extra first forward speed ratio (1') is established with the engagement of the clutches 50, 57 and 58. The clutch 50 connects the sun gear member 22 with the input shaft 17. The clutch 57 connects the planet carrier assembly member 26 with the sun gear member 42. The clutch 58 connects the planet carrier assembly member 36 with the ring gear member 44. The ring gear member 24 and sun gear member 32 do not rotate. The sun gear member 22 rotates at the same speed as the input shaft 17. The planet carrier assembly member 26 rotates at the same speed as the sun gear member 42. The speed of the planet carrier assembly member 26 is determined from the speed of the sun gear member 22 and the ring gear/sun gear tooth ratio of the planetary gear set 20. The planet carrier assembly member 36 rotates at the same speed as the ring gear member 44 and the output shaft 19. The ring gear member 34 rotates at the same speed as the planet carrier assembly member 46. The speed of the ring gear member 34 is determined from the speed of the planet carrier assembly member 36 and the ring gear/sun gear tooth ratio of the planetary gear set 30. The speed of the ring gear member 44, and therefore the output shaft 19, is determined from the speed of the planet carrier assembly member 46, the speed of the sun gear member 42, and the ring gear/sun gear tooth ratio of the planetary gear set 40. The numerical value of the extra first forward speed ratio (1') is determined utilizing the ring gear/sun gear tooth ratios of the planetary gear sets 20, 30 and 40.

The first forward speed ratio is established with the engagement of the clutches 50, 54 and 56. The clutch 50 connects the sun gear member 22 with the input shaft 17. The clutch 54 connects the sun gear member 42 with the input shaft 17. The clutch 56 connects the planet carrier assembly member 26 with the planet carrier assembly member 36. The ring gear member 24 and sun gear member 32 do not rotate. The planet carrier assembly member 26 rotates at the same speed as the planet carrier assembly member 36. The ring gear members 22, 42 rotate at the same speed as the input shaft 17. The speed of the planet carrier assembly member 26 is determined from the speed of the sun gear member 22 and the ring gear/sun gear tooth ratio of the planetary gear set 20. The ring gear member 34 rotates at the same speed as the planet carrier assembly member 46. The speed of the ring gear member 34 is determined from the speed of the planet carrier assembly member 36 and the ring gear/sun gear tooth ratio of the planetary gear set 30. The ring gear member 44 rotates at the same speed as the output shaft 19. The ring gear member 34, and therefore the output shaft 19, rotates at a speed determined from the speed of the planet carrier assembly member 46, the speed of the sun gear member 42, and the ring gear/sun gear tooth ratio of the planetary gear set 40. The numerical value of the first forward speed ratio is determined utilizing the ring gear/sun gear tooth ratios of the planetary gear sets 20, 30 and 40.

The second forward speed ratio is established with the engagement of the clutches 50, 56 and 58. The clutch 50 connects the sun gear member 22 with the input shaft 17. The clutch 56 connects the planet carrier assembly member 26 with the planet carrier assembly member 36. The clutch 58 connects the planet carrier assembly member 36 with the ring gear member 44. The ring gear member 24 and sun gear member 32 do not rotate. The planet carrier assembly members 26, 36 and ring gear member 44 rotate at the same speed as the output shaft 19. The sun gear member 22 rotates at the same speed as the input shaft 17. The speed of the planet carrier assembly member 26 is determined from the speed of the sun gear member 22 and the ring gear/sun gear tooth ratio of the planetary gear set 20. The ring gear member 34 rotates at the same speed as the planet carrier assembly member 46. The speed of the planet carrier assembly member 36, and therefore the output shaft 19, is determined from the speed of the ring gear member 34, and the ring gear/sun gear tooth ratio of the planetary gear set 30. The numerical value of the second forward speed ratio is determined utilizing the ring gear/sun gear tooth ratios of the planetary gear sets 20 and 30.

The third forward speed ratio is established with the engagement of the clutches 54, 56 and 58. The clutch 54 connects the sun gear member 42 with the input shaft 17. The clutch 56 connects the planet carrier assembly member 26 with the planet carrier assembly member 36. The clutch 58 connects the planet carrier assembly member 36 with the ring gear member 44. The ring gear member 24 and sun gear member 32 do not rotate. The planet carrier assembly members 26, 36 and ring gear member 44 rotate at the same speed as the output shaft 19. The ring gear member 34 rotates at the same speed as the planet carrier assembly member 46. The speed of the ring gear member 34 is determined from the speed of the planet carrier assembly member 36 and the ring gear/sun gear tooth ratio of the planetary gear set 30. The sun gear member 42 rotates at the same speed as the input shaft 17. The speed of the ring gear member 44, and therefore the output shaft 19, is determined from the speed of the planet carrier assembly member 46, the speed of the sun gear member 42, and the ring gear/sun gear tooth ratio of the planetary gear set 40. The numerical value of the third forward speed ratio is determined utilizing the ring gear/sun gear tooth ratios of the planetary gear sets 30 and 40.

The extra third forward speed ratio (3') is established with the engagement of the clutches 50, 56 and 57. The clutch 50 connects the sun gear member 22 with the input shaft 17. The clutch 56 connects the planet carrier assembly member 26 with the planet carrier assembly member 36. The clutch 57 connects the planet carrier assembly member 26 with the sun gear member 42. The ring gear member 24 and sun gear member 32 do not rotate. The planet carrier assembly member 26 rotates at the same speed as the planet carrier assembly member 36 and the sun gear member 42. The sun gear member 22 rotates at the same speed as the input shaft 17. The planet carrier assembly member 26 rotates at a speed determined from the speed of the sun gear member 22 and the ring gear/sun gear tooth ratio of the planetary gear set 20. The ring gear member 34 rotates at the same speed as the planet carrier assembly member 46. The speed of the ring gear member 34 is determined from the speed of the planet carrier assembly member 36 and the ring gear/sun gear tooth ratio of the planetary gear set 30. The ring gear member 44 rotates at the same speed as the output shaft 19. The speed of the ring gear member 44, and therefore the output shaft 19, is determined from the speed of the planet carrier assembly member 46, the speed of the sun gear member 42, and the ring gear/sun gear tooth ratio of the planetary gear set 40. The numerical value of the extra third forward speed ratio (3') is determined utilizing the ring gear/sun gear tooth ratios of the planetary gear sets 20, 30 and 40.

The fourth forward speed ratio is established with the engagement of the clutches 52, 56 and 58. The clutch 52 connects the planet carrier assembly member 46 with the input shaft 17. The clutch 56 connects the planet carrier assembly member 26 with the planet carrier assembly member 36. The clutch 58 connects the planet carrier assembly member 36 with the ring gear member 44. The ring gear member 24 and sun gear member 32 do not rotate. The planet carrier assembly members 26, 36 and ring gear member 44 rotate at the same speed as the output shaft 19. The ring gear member 34 and planet carrier assembly member 46 rotate at the same speed as the input shaft 17. The speed of the planet carrier assembly member 36, and therefore the output shaft 19, is determined from the speed of the ring gear member 34 and the ring gear/sun gear tooth ratio of the planetary gear set 30. The numerical value of the fourth forward speed ratio is determined utilizing the ring gear/sun gear tooth ratio of the planetary gear set 30.

The fifth forward speed ratio is established with the engagement of the clutches 52, 54 and 56. In this configuration, the input shaft 17 is directly connected to the output shaft 19. The numerical value of the fifth forward speed ratio is one.

The sixth forward speed ratio is established with the engagement of the clutches 52, 56 and 57. The clutch 52 connects the planet carrier assembly member 46 with the input shaft 17. The clutch 56 connects the planet carrier assembly member 26 with the planet carrier assembly member 36. The clutch 57 connects the planet carrier assembly member 26 with the sun gear member 42. The ring gear member 24 and sun gear member 32 do not rotate. The planet carrier assembly member 26 rotates at the same speed as the planet carrier assembly member 36 and the sun gear member 42. The ring gear member 34 and planet carrier assembly member 46 rotate at the same speed as the input shaft 17. The speed of the planet carrier assembly member 36 is determined from the speed of the ring gear member 34 and the ring gear/sun gear tooth ratio of the planetary gear set 30. The ring gear member 44 rotates at the same speed as the output shaft 19. The ring gear member 44, and therefore the output shaft 19, rotates at a speed determined from the speed of the planet carrier assembly member 46, the speed of the sun gear member 42, and the ring gear/sun gear tooth ratio of the planetary gear set 40. The numerical value of the sixth forward speed ratio is determined utilizing the ring gear/sun gear tooth ratios of the planetary gear sets 30 and 40.

The seventh forward speed ratio is established with the engagement of the clutches 50, 52 and 57. The clutch 50 connects the sun gear member 22 with the input shaft 17. The clutch 52 connects the planet carrier assembly member 46 with the input shaft 17. The clutch 57 connects the planet carrier assembly member 26 with the sun gear member 42. The ring gear member 24 and sun gear member 32 do not rotate. The planet carrier assembly member 26 rotates at the same speed as the sun gear member 42. The sun gear member 22, ring gear member 34, and planet carrier assembly member 46 rotate at the same speed as the input shaft 17. The planet carrier assembly member 26 rotates at a speed determined from the speed of the sun gear member 22 and the ring gear/sun gear tooth ratio of the planetary gear set 20. The ring gear member 44 rotates at the same speed as the output shaft 19. The ring gear member 44, and therefore the output shaft 19, rotates at a speed determined from the speed of the planet carrier assembly member 46, the speed of the sun gear member 42, and the ring gear/sun gear tooth ratio of the planetary gear set 40. The numerical value of the seventh forward speed ratio is determined utilizing the ring gear/sun gear tooth ratios of the planetary gear sets 20 and 40.

The eighth forward speed ratio is established with the engagement of the clutches 52 and 57, and the brake 59. The clutch 52 connects the planet carrier assembly member 46 with the input shaft 17. The clutch 57 connects the planet carrier assembly member 26 with the sun gear member 42. The brake 59 connects the sun gear member 22 with the transmission housing 60. The planetary gear set 20 and sun gear members 32, 42 do not rotate. The ring gear member 34 and planet carrier assembly member 46 rotate at the input shaft 17. The ring gear member 44 rotates at the same speed as the output shaft 19. The ring gear member 44, and therefore the output shaft 19, rotates at a speed determined from the speed of the planet carrier assembly member 46 and the ring gear/sun gear tooth ratio of the planetary gear set 40. The numerical value of the eighth forward speed ratio is determined utilizing the ring gear/sun gear tooth ratio of the planetary gear set 40.

The extra eighth forward speed ratio (8') is established with the engagement of the clutches 54, 56 and 57. The clutch 54 connects the sun gear member 42 with the input shaft 17. The clutch 56 connects the planet carrier assembly member 26 with the planet carrier assembly member 36. The clutch 57 connects the planet carrier assembly member 26 with the sun gear member 42. The ring gear member 24 and sun gear member 32 do not rotate. The planet carrier assembly members 26, 36 and sun gear member 42 rotate at the same speed as the input shaft 17. The ring gear member 34 rotates at the same speed as the planet carrier assembly member 46. The speed of the ring gear member 34 is determined from the speed of the planet carrier assembly member 36 and the ring gear/sun gear tooth ratio of the planetary gear set 30. The ring gear member 44 rotates at the same speed as the output shaft 19. The ring gear member 44, and therefore the output shaft 19, rotates at a speed determined from the speed of the planet carrier assembly member 46, the speed of the sun gear member 42, and the ring gear/sun gear tooth ratio of the planetary gear set 40. The numerical value of the extra eighth (8') is determined utilizing the ring gear/sun gear tooth ratios of the planetary gear sets 30 and 40.

As set forth above, the engagement schedule for the torque-transmitting mechanisms is shown in the truth table of FIG. 1b. This truth table also provides an example of torque ratios that are available utilizing the ring gear/sun gear tooth ratios given by way of example in FIG. 1b. The $N_{R1}/N_{S1}$ value is the tooth ratio of the planetary gear set 20; the $N_{R2}/N_{S2}$ value is the tooth ratio of the planetary gear set 30; and the $N_{R3}/N_{S3}$ value is the tooth ratio of the planetary gear set 40. Also, the chart of FIG. 1b describes the ratio steps that are attained utilizing the sample of tooth ratios given. For example, the step ratio between the first and second forward torque ratios is 1.66, while the step ratio between the reverse and first forward ratio is −0.45.

Figures 2A, 2B:
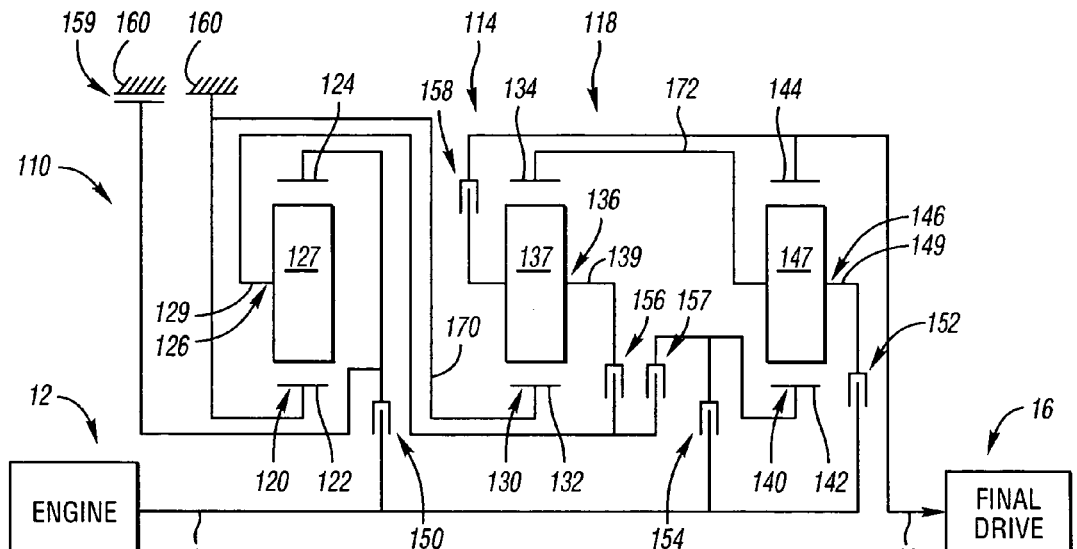

FIG. 2a shows a powertrain 110 having a conventional engine 12, a planetary transmission 114, and a conventional final drive mechanism 16.

The planetary transmission 114 includes an input shaft 17 connected with the engine 12, a planetary gear arrangement 118, and an output shaft 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly 126. The planet carrier assembly 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear arrangement 118 also includes seven torque-transmitting mechanisms 150, 152, 154, 156, 157, 158 and 159. The torque-transmitting mechanisms 150, 152, 154, 156, 157 and 158 are rotating-type torque-transmitting mechanisms, commonly termed clutches. The torque-transmitting mechanism 159 is a stationary-type torque transmitting mechanism, commonly termed brake or reaction clutch.

The input shaft 17 is not continuously connected with any planetary gear member. The output shaft 19 is continuously connected with the ring gear member 144. The sun gear member 122 is continuously connected with the sun gear member 132 and with the transmission housing 160 through the interconnecting member 170. The ring gear member 134 is continuously connected with the planet carrier assembly member 146 through the interconnecting member 172.

The ring gear member 124 is selectively connectable with the input shaft 17 through the clutch 150. The planet carrier assembly member 146 is selectively connectable with the input shaft 17 through the clutch 152. The sun gear member 142 is selectively connectable with the input shaft 17 through the clutch 154. The planet carrier assembly member 126 is selectively connectable with the planet carrier assembly member 136 through the clutch 156. The planet carrier assembly member 126 is selectively connectable with the sun gear member 142 through the clutch 157. The planet carrier assembly member 136 is selectively connectable with the ring gear member 144 through the clutch 158. The ring gear member 124 is selectively connectable with the transmission housing 160 through the brake 159.

The truth table of FIG. 2b describes the engagement sequence utilized to provide eight forward torque ratios and one reverse speed ratio in the planetary gear arrangement 118 shown in FIG. 2a, as well as extra sixth, seventh and eighth forward torque ratios.

The truth tables given in FIGS. 2b, 3b, 4b, 5b, 6b, 7b, 8b, 9b, 10b, 11b, 12b and 13b show the engagement sequences for the torque-transmitting mechanisms to provide at least eight forward torque ratios and at least one reverse ratio. As shown and described above for the configuration in FIG. 1a, those skilled in the art will understand from the respective truth tables how the torque ratios are established through the planetary gear sets identified in the written description.

As set forth above, the truth table of FIG. 2b describes the engagement sequence of the torque-transmitting mechanisms utilized to provide the reverse drive ratio and eight forward torque ratios, as well as the extra sixth, seventh and eighth forward torque ratios. The truth table also provides an example of the ratios that can be attained with the family members shown in FIG. 2a utilizing the sample tooth ratios given in FIG. 2b. The $N_{R1}/N_{S1}$ value is the tooth ratio of the planetary gear set 120; the $N_{R2}/N_{S2}$ value is the tooth ratio of the planetary gear set 130; and the $N_{R3}/N_{S3}$ value is the tooth ratio of the planetary gear set 140. Also shown in FIG. 2b are the ratio steps between single step ratios in the forward direction as well as the reverse to first step ratio. For example, the first to second step ratio is 1.67.

Figures 3A, 3B:
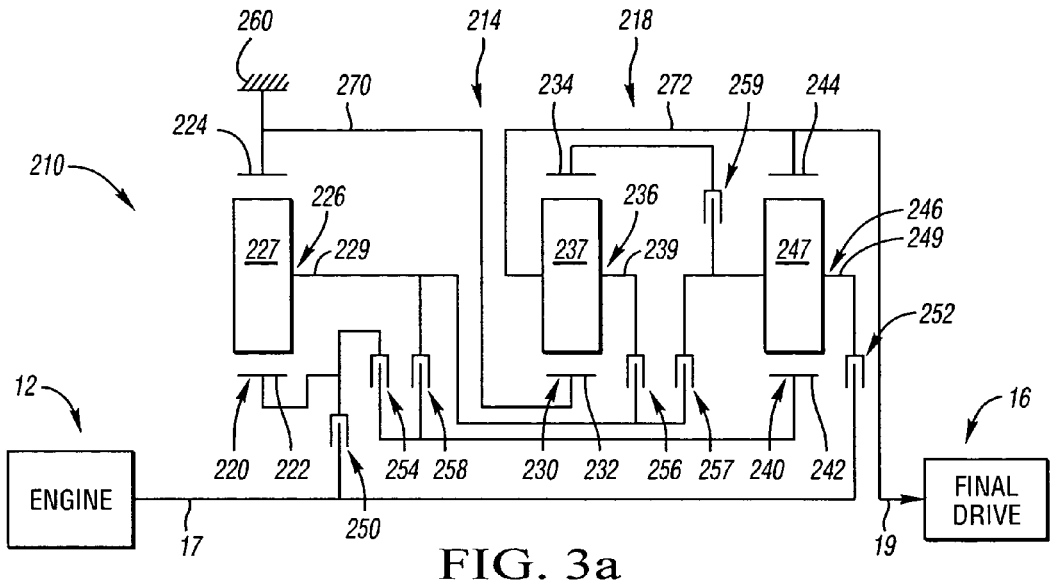

Turning to FIG. 3a, a powertrain 210 includes the engine 12, a planetary transmission 214, and a final drive mechanism 16. The planetary transmission 214 includes an input shaft 17 connected with the engine 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly 226. The planet carrier assembly 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear arrangement 218 also includes seven torque-transmitting mechanisms 250, 252, 254, 256, 257, 258 and 259. The torque-transmitting mechanisms 250, 252, 254, 256, 257, 258 and 259 are all rotating type torque-transmitting mechanisms, commonly termed clutches.

The input shaft 17 not continuously connected with any planetary gear member. The output shaft 19 is continuously connected with the ring gear member 244. The ring gear member 224 is continuously connected with the sun gear member 232 and with the transmission housing 260 through the interconnecting member 270. The planet carrier assembly member 236 is continuously connected with the ring gear member 244 through the interconnecting member 272.

The sun gear member 222 is selectively connectable with the input shaft 17 through the clutch 250. The planet carrier assembly member 246 is selectively connectable with the input shaft 17 through the clutch 252. The sun gear member 222 is selectively connectable with the sun gear member 242 through the clutch 254. The planet carrier assembly member 226 is selectively connectable with the planet carrier assembly member 236 through the clutch 256. The planet carrier assembly member 226 is selectively connectable with the planet carrier assembly member 246 through the clutch 257. The planet carrier assembly member 226 is selectively connectable with the sun gear member 242 through the clutch 258. The ring gear member 234 is selectively connectable with the planet carrier assembly member 246 through the clutch 259.

As shown in the truth table in FIG. 3b, the torque-transmitting mechanisms are engaged in combinations of three to establish eight forward torque ratios and two reverse torque ratios, as well as an extra fifth forward speed ratio.

As previously set forth, the truth table of FIG. 3b describes the combinations of engagements utilized for the forward and reverse torque ratios. The truth table also provides an example of torque ratios that are available with the family member described above. These examples of torque ratios are determined utilizing the tooth ratios given in FIG. 3b. The $N_{R1}/N_{S1}$ value is the tooth ratio of the planetary gear set 220; the $N_{R2}/N_{S2}$ value is the tooth ratio of the planetary gear set 230; and the $N_{R3}/N_{S3}$ value is the tooth ratio of the planetary gear set 240. Also depicted in FIG. 3b is a chart representing the ratio steps between adjacent forward torque ratios and between the first and reverse speed ratio. For example, the first to second ratio interchange has a step of 1.65.

Figures 4A, 4B:
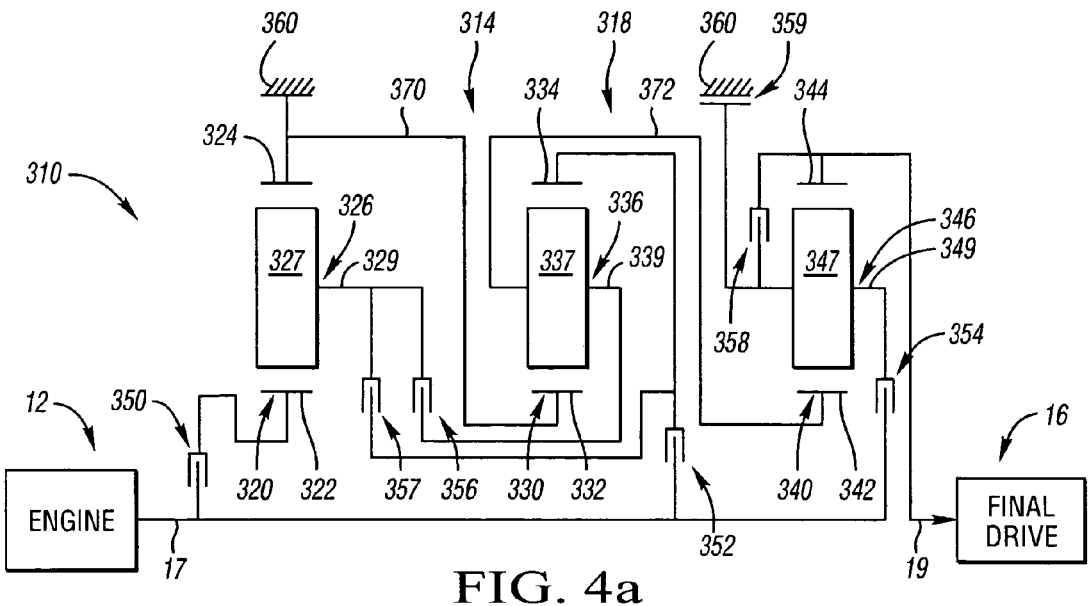

A powertrain 310, shown in FIG. 4a, includes the engine 12, a planetary transmission 314, and the final drive mechanism 16. The planetary transmission 314 includes an input shaft 17 connected with the engine 12, a planetary gear arrangement 318, and an output shaft 19 continuously connected with the final drive mechanism 16. The planetary gear arrangement 318 includes three planetary gear sets 320, 330 and 340.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear arrangement 318 also includes seven torque-transmitting mechanisms 350, 352, 354, 356, 357, 358 and 359. The torque-transmitting mechanisms 350, 352, 354, 356, 357 and 358 are rotating type torque-transmitting mechanisms, commonly termed clutches. The torque-transmitting mechanism 359 is a stationary-type torque transmitting mechanism, commonly termed brake or reaction clutch.

The input shaft 17 is not continuously connected with any planetary gear member. The output shaft 19 is continuously connected with the ring gear member 344. The ring gear member 324 is continuously connected with the sun gear member 332 and with the transmission housing 360 through the interconnecting member 370. The planet carrier assembly member 336 is continuously connected with the sun gear member 342 through the interconnecting member 372.

The sun gear member 322 is selectively connectable with the input shaft 17 through the clutch 350. The ring gear member 334 is selectively connectable with the input shaft 17 through the clutch 352. The planet carrier assembly member 346 is selectively connectable with the input shaft 17 through the clutch 354. The planet carrier assembly member 326 is selectively connectable with the planet carrier assembly member 336 through the clutch 356. The planet carrier assembly member 326 is selectively connectable with the ring gear member 334 through the clutch 357. The ring gear member 344 is selectively connectable with the planet carrier assembly member 346 through the clutch 358. The planet carrier assembly member 346 is selectively connectable with the transmission housing 360 through the brake 359.

The truth table shown in FIG. 4b describes the engagement combination and the engagement sequence necessary to provide three reverse drive ratios and eight forward torque ratios. A sample of the numerical values for the ratios is also provided in the truth table of FIG. 4b. These values are determined utilizing the ring gear/sun gear tooth ratios also given in FIG. 4b. The $N_{R1}/N_{S1}$ value is the tooth ratio for the planetary gear set 320; the $N_{R1}/N_{S2}$ value is the tooth ratio for the planetary gear set 330; and the $N_{R3}/N_{S3}$ value is the tooth ratio for the planetary gear set 340. Also given in FIG. 4b is a chart describing the step ratios between the adjacent forward torque ratios and the reverse to first forward speed ratio. For example, the first to second forward speed ratio step is 1.66.

Figures 5A, 5B:
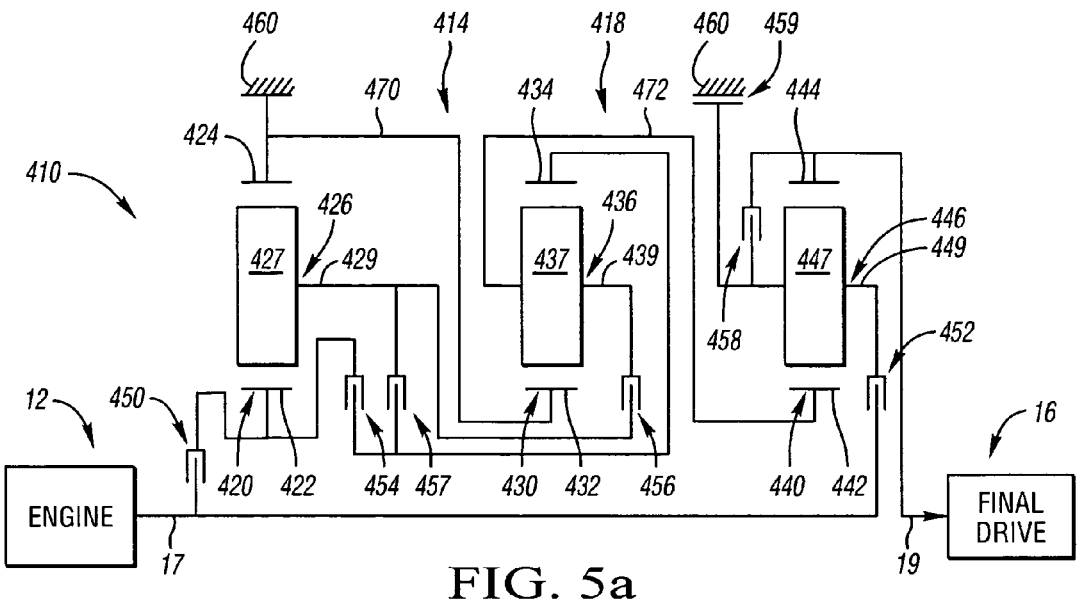

A powertrain 410, shown in FIG. 5a, includes the engine 12, a planetary transmission 414 and the final drive mechanism 16. The planetary transmission 414 includes a planetary gear arrangement 418, input shaft 17 and output shaft 19. The planetary gear arrangement 418 includes three simple planetary gear sets 420, 430 and 440.

The planetary gear set 420 includes a sun gear member 422, a ring gear member 424, and a planet carrier assembly 426. The planet carrier assembly 426 includes a plurality of pinion gears 427 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the ring gear member 434 and the sun gear member 432.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear arrangement 418 also includes seven torque-transmitting mechanisms 450, 452, 454, 456, 457, 458 and 459. The torque-transmitting mechanisms 450, 452, 454, 456, 457 and 458 are rotating type torque-transmitting mechanisms, commonly termed clutches. The torque-transmitting mechanism 459 is a stationary-type torque transmitting mechanism, commonly termed brake or reaction clutch.

The input shaft 17 is not continuously connected with any planetary gear member. The output shaft 19 is continuously connected with the ring gear member 444. The ring gear/sun gear tooth ratio 424 is continuously connected with the sun gear member 432 and with the transmission housing 460 through the interconnecting member 470. The planet carrier assembly member 436 is continuously connected with the sun gear member 442 through the interconnecting member 472.

The sun gear member 422 is selectively connectable with the input shaft 17 through the clutch 450. The planet carrier assembly member 446 is selectively connectable with the input shaft 17 through the clutch 452. The sun gear member 422 is selectively connectable with the ring gear member 434 through the clutch 454. The planet carrier assembly member 426 is selectively connectable with the planet carrier assembly member 436 through the clutch 456. The planet carrier assembly member 426 is selectively connectable with the ring gear member 434 through the clutch 457. The ring gear member 444 is selectively connectable with the planet carrier assembly member 446 through the clutch 458. The planet carrier assembly member 446 is selectively connectable with the transmission housing 460 through the brake 459.

The truth table shown in FIG. 5b describes the engagement combination and sequence of the torque-transmitting mechanisms 450, 452, 454, 456, 457, 458 and 459 that are employed to provide the forward and reverse drive ratios.

Also given in the truth table of FIG. 5b is a set of numerical values that are attainable with the present invention utilizing the ring gear/sun gear tooth ratios shown. The $N_{R1}/N_{S1}$ value is the tooth ratio of the planetary gear set 420; the $N_{R2}/N_{S2}$ value is the tooth ratio of the planetary gear set 430; and the $N_{R3}/N_{S3}$ value is the tooth ratio of the planetary gear set 440.

FIG. 5b also provides a chart of the ratio steps between adjacent forward ratios and between the reverse and first forward ratio. For example, the ratio step between the first and second forward ratios is 1.66.

Figures 6A, 6B:
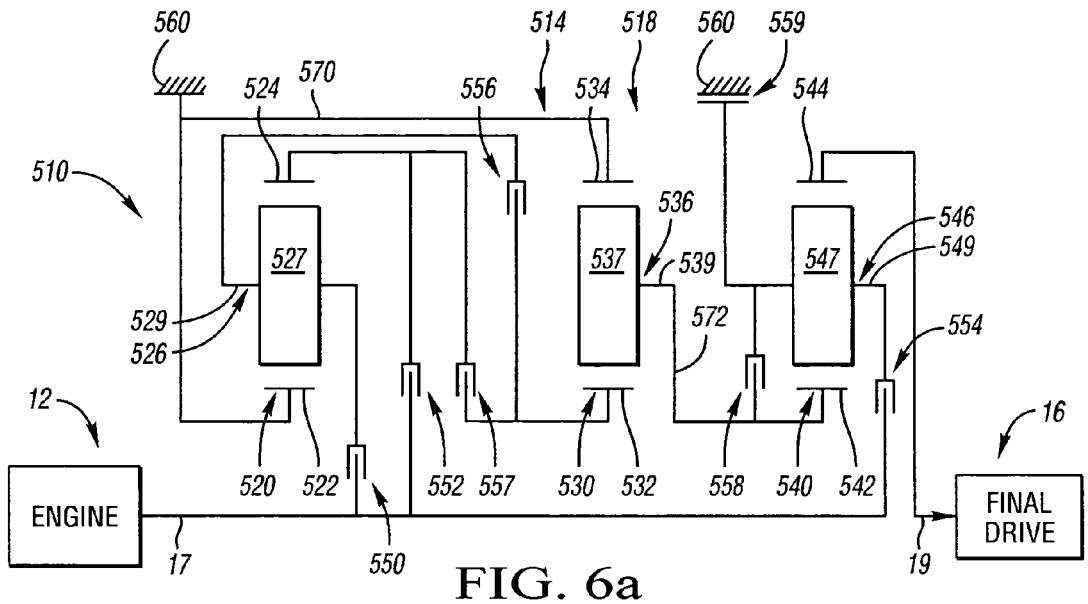

A powertrain 510, shown in FIG. 6a, includes an engine 12, a planetary gear transmission 514 and the final drive mechanism 16. The planetary transmission 514 includes the input shaft 17, a planetary gear arrangement 518 and the output shaft 19. The planetary gear arrangement 518 includes three planetary gear sets 520, 530 and 540.

The planetary gear set 520 includes a sun gear member 522, a ring gear member 524, and a planet carrier assembly 526. The planet carrier assembly 526 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the sun gear member 532 and the ring gear member 534.

The planetary gear set 540 includes a sun gear member 542, a ring gear member 544, and a planet carrier assembly member 546. The planet carrier assembly member 546 includes a plurality of pinion gears 547 rotatably mounted on a carrier member 549 and disposed in meshing relationship with both the sun gear member 542 and the ring gear member 544.

The planetary gear arrangement 518 also includes seven torque-transmitting mechanisms 550, 552, 554, 556, 557, 558 and 559. The torque-transmitting mechanisms 550, 552, 554, 556, 557 and 558 are rotating type torque-transmitting mechanisms, commonly termed clutches. The torque-transmitting mechanism 559 is a stationary-type torque transmitting mechanism, commonly termed brake or reaction clutch.

The input shaft 17 is not continuously connected with any planetary gear member. The output shaft 19 is continuously connected with the ring gear member 544. The sun gear member 522 is continuously connected with the ring gear member 534 and with the transmission housing 560 through the interconnecting member 570. The planet carrier assembly member 536 is continuously connected with the sun gear member 542 through the interconnecting member 572.

The planet carrier assembly member 526 is selectively connectable with the input shaft 17 through the clutch 550. The ring gear member 524 is selectively connectable with the input shaft 17 through the clutch 552. The planet carrier assembly member 546 is selectively connectable with the input shaft 17 through the clutch 554. The planet carrier assembly member 526 is selectively connectable with the sun gear member 532 through the clutch 556. The ring gear member 524 is selectively connectable with the sun gear member 532 through the clutch 557. The planet carrier assembly member 536 is selectively connectable with the planet carrier assembly member 546 through the clutch 558. The planet carrier assembly member 546 is selectively connectable with the transmission housing 560 through the brake 559.

The truth table shown in FIG. 6b describes the engagement sequence and combination of the torque-transmitting mechanisms to provide three reverse torque ratios and eight forward torque ratios. The chart of FIG. 6b describes the ratio steps between adjacent forward torque ratios and the ratio step between the reverse and first forward speed ratio.

The sample torque ratios given in the truth table are determined utilizing the tooth ratio values also given in FIG. 6b. The $N_{R1}/N_{S1}$ value is the tooth ratio of the planetary gear set 520; the $N_{R2}/N_{S2}$ value is the tooth ratio of the planetary gear set 530; and the $N_{R3}/N_{S3}$ value is the tooth ratio of the planetary gear set 540.

Figures 7A, 7B:
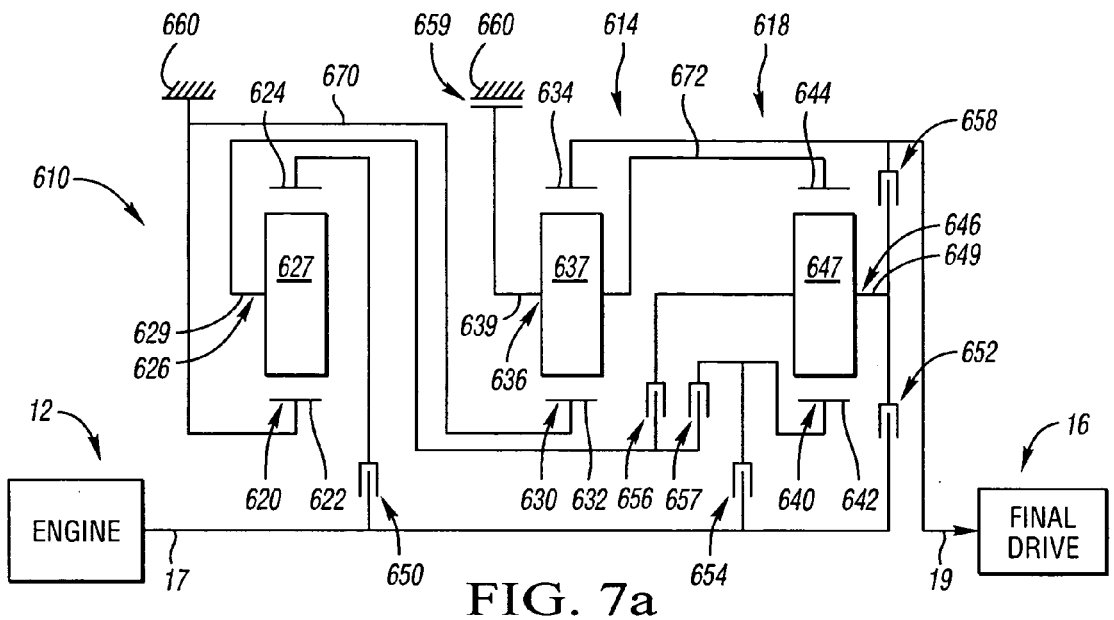

A powertrain 610, shown in FIG. 7a, has the engine 12, a planetary transmission 614 and the final drive mechanism 16. The planetary transmission 614 includes the input shaft 17, a planetary gear arrangement 618 and the output shaft 19. The planetary gear arrangement 618 includes three planetary gear sets 620, 630 and 640.

The planetary gear set 620 includes a sun gear member 622, a ring gear member 624, and a planet carrier assembly 626. The planet carrier assembly 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the sun gear member 632 and the ring gear member 634.

The planetary gear set 640 includes a sun gear member 642, a ring gear member 644, and a planet carrier assembly member 646. The planet carrier assembly member 646 includes a plurality of pinion gears 647 rotatably mounted on a carrier member 649 and disposed in meshing relationship with both the sun gear member 642 and the ring gear member 644.

The planetary gear arrangement 618 also includes seven torque-transmitting mechanisms 650, 652, 654, 656, 657, 658 and 659. The torque-transmitting mechanisms 650, 652, 654, 656, 657 and 658 are rotating type torque-transmitting mechanisms, commonly termed clutches. The torque-transmitting mechanism 659 is a stationary-type torque transmitting mechanism, commonly termed brake or reaction clutch.

The input shaft 17 is not continuously connected with any planetary gear member. The output shaft 19 is continuously connected with the ring gear member 634. The sun gear member 622 is continuously connected with the sun gear member 632 and with the transmission housing 660 through the interconnecting member 670. The planet carrier assembly member 636 is continuously connected with the ring gear member 644 through the interconnecting member 672.

The ring gear member 624 is selectively connectable with the input shaft 17 through the clutch 650. The planet carrier assembly member 646 is selectively connectable with the input shaft 17 through the clutch 652. The sun gear member 642 is selectively connectable with the input shaft 17 through the clutch 654. The planet carrier assembly member 626 is selectively connectable with the planet carrier assembly member 646 through the clutch 656. The planet carrier assembly member 626 is selectively connectable with the sun gear member 642 through the clutch 657. The ring gear member 634 is selectively connectable with the planet carrier assembly member 646 through the clutch 658. The planet carrier assembly member 636 is selectively connectable with the transmission housing 660 through the brake 659.

The truth table shown in FIG. 7b describes the combination of torque-transmitting mechanism engagements that will provide the reverse drive ratio and eight forward torque ratios (including the extra fifth ratio), as well as the sequence of these engagements and interchanges.

The ratio values given are by way of example and are established utilizing the ring gear/sun gear tooth ratios given in FIG. 7b. For example, the $N_{R1}/N_{S1}$ value is the tooth ratio of the planetary gear set 620; the $N_{R2}/N_{S2}$ value is the tooth ratio of the planetary gear set 630; and the $N_{R3}/N_{S3}$ value is the tooth ratio of the planetary gear set 640. The ratio steps between adjacent forward ratios and the reverse to first ratio are also given in FIG. 7b.

Figures 8A, 8B:
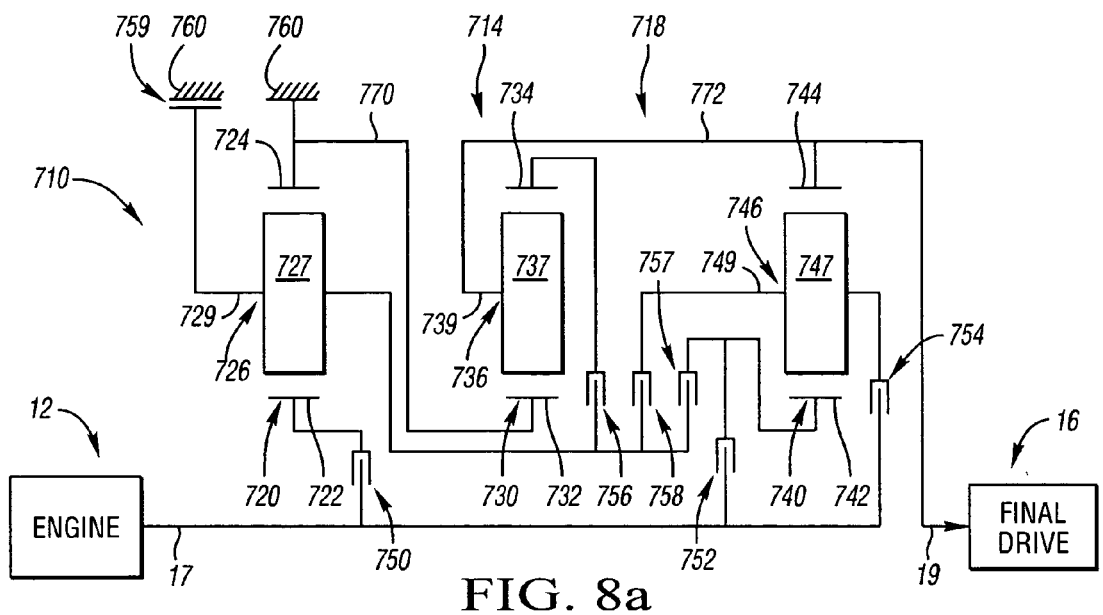

A powertrain 710, shown in FIG. 8a, has the conventional engine 12, a planetary transmission 714, and the conventional final drive mechanism 16. The engine 12 is drivingly connected with the planetary transmission 714 through the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730, and a third planetary gear set 740.

The planetary gear set 720 includes a sun gear member 722, a ring gear member 724, and a planet carrier assembly 726. The planet carrier assembly 726 includes a plurality of pinion gears 727 rotatably mounted on a carrier member 729. The pinion gears 727 are disposed in meshing relationship with the sun gear member 722 and the ring gear member 724.

The planetary gear set 730 includes a sun gear member 732, a ring gear member 734, and a planet carrier assembly member 736. The planet carrier assembly member 736 includes a plurality of pinion gears 737 rotatably mounted on a carrier member 739 and disposed in meshing relationship with both the sun gear member 732 and the ring gear member 734.

The planetary gear set 740 includes a sun gear member 742, a ring gear member 744, and a planet carrier assembly member 746. The planet carrier assembly member 746 includes a plurality of pinion gears 747 rotatably mounted on a carrier member 749 and disposed in meshing relationship with both the sun gear member 742 and the ring gear member 744.

The planetary gear arrangement 718 also includes seven torque-transmitting mechanisms 750, 752, 754, 756, 757, 758 and 759. The torque-transmitting mechanisms 750, 752, 754, 756, 757 and 758 are rotating type torque-transmitting mechanisms, commonly termed clutches. The torque-transmitting mechanism 759 is a stationary-type torque transmitting mechanism, commonly termed brake or reaction clutch.

The input shaft 17 is not continuously connected with any planetary gear member. The output shaft 19 is continuously connected with the ring gear member 744. The ring gear member 724 is continuously connected with the sun gear member 732 and with the transmission housing 760 through the interconnecting member 770. The planet carrier assembly member 736 is continuously connected with the ring gear member 734 through the interconnecting member 772.

The sun gear member 722 is selectively connectable with the input shaft 17 through the clutch 750. The sun gear member 742 is selectively connectable with the input shaft 17 through the clutch 752. The planet carrier assembly member 746 is selectively connectable with the input shaft 17 through the clutch 754. The planet carrier assembly member 726 is selectively connectable with the ring gear member 734 through the clutch 756. The planet carrier assembly member 726 is selectively connectable with the sun gear member 742 through the clutch 757. The planet carrier assembly member 726 is selectively connectable with the planet carrier assembly member 746 through the clutch 758. The planet carrier assembly member 726 is selectively connectable with the transmission housing 760 through the brake 759.

The truth table of FIG. 8b defines the torque-transmitting mechanism engagement sequence utilized for each of the forward and reverse torque ratios. Also given in the truth table is a set of numerical values that are attainable with the present invention utilizing the ring gear/sun gear tooth ratios given in FIG. 8b. The $N_{R1}/N_{S1}$ value is the tooth ratio of the planetary gear set 720; the $N_{R2}/N_{S2}$ value is the tooth ratio of the planetary gear set 730; and the $N_{R3}/N_{S3}$ value is the tooth ratio of the planetary gear set 740.

FIG. 8b also provides a chart of the ratio steps between adjacent forward ratios and between the reverse and first forward ratio. For example, the ratio step between the first and second forward ratios is 1.78.

Figures 9A, 9B:
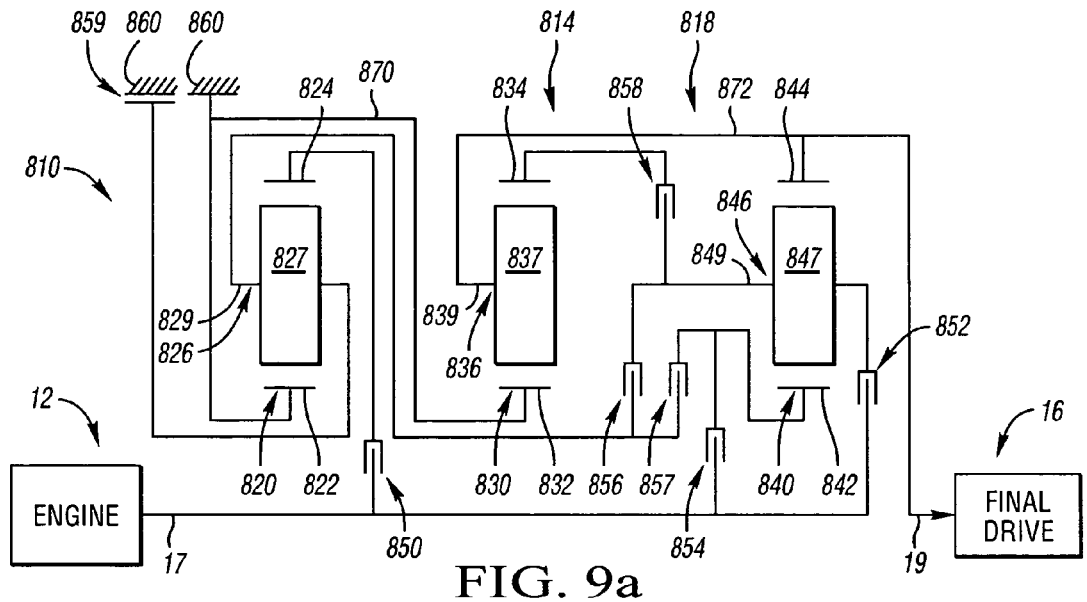

A powertrain 810, shown in FIG. 9a, has the conventional engine 12, a planetary transmission 814, and the final drive mechanism 16. The engine 12 is drivingly connected with the planetary transmission 814 through the input shaft 17. The planetary transmission 814 is drivingly connected with the final drive mechanism 16 through the output shaft 19. The planetary transmission 814 includes a planetary gear arrangement 818 that has a first planetary gear set 820, a second planetary gear set 830, and a third planetary gear set 840.

The planetary gear set 820 includes a sun gear member 822, a ring gear member 824, and a planet carrier assembly 826. The planet carrier assembly 826 includes a plurality of pinion gears 827 rotatably mounted on a carrier member 829 and disposed in meshing relationship with the sun gear member 822 and the ring gear member 824.

The planetary gear set 830 includes a sun gear member 832, a ring gear member 834, and a planet carrier assembly member 836. The planet carrier assembly member 836 includes a plurality of pinion gears 837 rotatably mounted on a carrier member 839 and disposed in meshing relationship with both the sun gear member 832 and the ring gear member 834.

The planetary gear set 840 includes a sun gear member 842, a ring gear member 844, and a planet carrier assembly member 846. The planet carrier assembly member 846 includes a plurality of pinion gears 847 rotatably mounted on a carrier member 849 and disposed in meshing relationship with both the ring gear member 844 and the sun gear member 842.

The planetary gear arrangement 818 also includes seven torque-transmitting mechanisms 850, 852, 854, 856, 857, 858 and 859. The torque-transmitting mechanisms 850, 852, 854, 856, 857 and 858 are rotating type torque-transmitting mechanisms, commonly termed clutches. The torque-transmitting mechanism 859 is a stationary-type torque transmitting mechanism, commonly termed brake or reaction clutch.

The input shaft 17 is not continuously connected with any planetary gear member. The output shaft 19 is continuously connected with the ring gear member 844. The sun gear member 822 is continuously connected with the sun gear member 832 and with the transmission housing 860 through the interconnecting member 870. The planet carrier assembly member 836 is continuously connected with the ring gear member 844 through the interconnecting member 872.

The ring gear member 824 is selectively connectable with the input shaft 17 through the clutch 850. The planet carrier assembly member 846 is selectively connectable with the input shaft 17 through the clutch 852. The sun gear member 842 is selectively connectable with the input shaft 17 through the clutch 854. The planet carrier assembly member 826 is selectively connectable with the planet carrier assembly member 846 through the clutch 856. The planet carrier assembly member 826 is selectively connectable with the sun gear member 842 through the clutch 857. The ring gear member 834 is selectively connectable with the planet carrier assembly member 846 through the clutch 858. The planet carrier assembly member 826 is selectively connectable with the transmission housing 860 through the brake 859.

The truth table shown in FIG. 9b defines the torque-transmitting mechanism engagement sequence that provides the reverse speed ratio and eight forward torque ratios shown in the truth table and available with the planetary gear arrangement 818, as well as an extra fifth forward ratio. A sample of numerical values for the individual ratios is also given in the truth table of FIG. 9b. These numerical values have been calculated using the ring gear/sun gear tooth ratios also given by way of example in FIG. 9b. The $N_{R1}/N_{S1}$ value is the tooth ratio of the planetary gear set 820; the $N_{R2}/N_{S2}$ value is the tooth ratio of the planetary gear set 830; and the $N_{R3}/N_{S3}$ value is the tooth ratio of the planetary gear set 840. FIG. 9b also describes the ratio steps between adjacent forward ratios and between the reverse and first forward ratio.

Figures 10A, 10B:
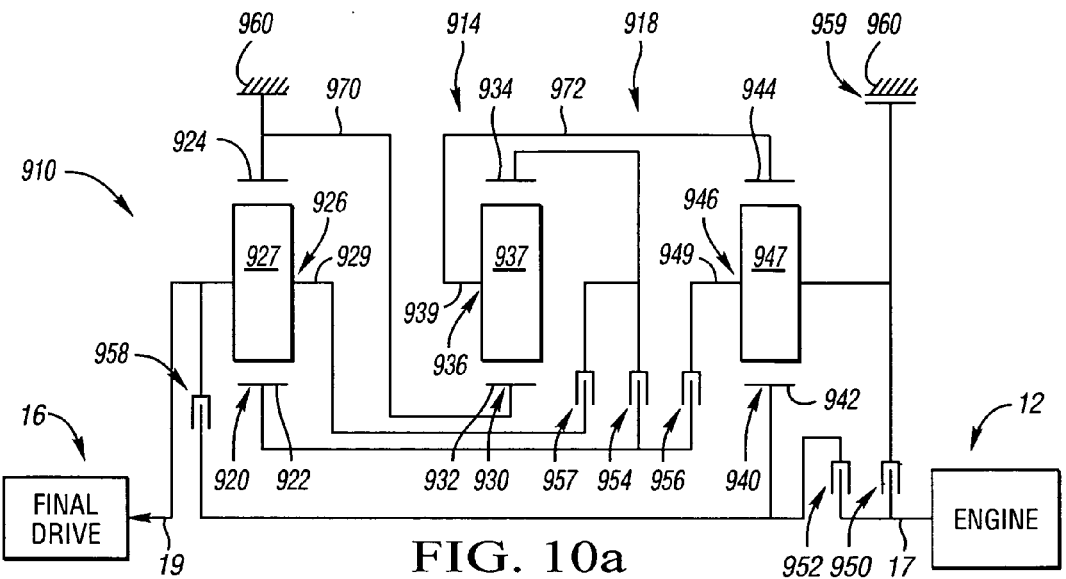

The powertrain 910, shown in FIG. 10a, includes the conventional engine 12, a planetary transmission 914, and the conventional final drive mechanism 16. The engine 12 is drivingly connected with the planetary transmission 914 through the input shaft 17. The planetary transmission 914 is drivingly connected with the final drive mechanism 16 through the output shaft 19. The planetary transmission 914 includes a planetary gear arrangement 918 that has a first planetary gear set 920, a second planetary gear set 930, and a third planetary gear set 940.

The planetary gear set 920 includes a sun gear member 922, a ring gear member 924, and a planet carrier assembly 926. The planet carrier assembly 926 includes a plurality of pinion gears 927 that are rotatably mounted on a carrier member 929 and disposed in meshing relationship with the sun gear member 922 and the ring gear member 924, respectively.

The planetary gear set 930 includes a sun gear member 932, a ring gear member 934, and a planet carrier assembly member 936. The planet carrier assembly member 936 includes a plurality of pinion gears 937 rotatably mounted on a carrier member 939 and disposed in meshing relationship with both the ring gear member 934 and the sun gear member 932.

The planetary gear set 940 includes a sun gear member 942, a ring gear member 944, and a planet carrier assembly member 946. The planet carrier assembly member 946 includes a plurality of pinion gears 947 rotatably mounted on a carrier member 949 and disposed in meshing relationship with both the sun gear member 942 and the ring gear member 944.

The planetary gear arrangement 918 also includes seven torque-transmitting mechanisms 950, 952, 954, 956, 957, 958 and 959. The torque-transmitting mechanisms 950, 952, 954, 956, 957 and 958 are rotating-type torque-transmitting mechanisms, commonly termed clutches. The torque-transmitting mechanism 959 is a stationary-type torque-transmitting mechanism, commonly termed brake or reaction clutch.

The input shaft 17 is not continuously connected with any planetary gear member. The output shaft 19 is continuously connected with the planet carrier assembly member 926. The ring gear member 924 is continuously connected with the sun gear member 932 and with the transmission housing 960 through the interconnecting member 970. The planet carrier assembly member 936 is continuously connected with the ring gear member 944 through the interconnecting member 972.

The planet carrier assembly member 946 is selectively connectable with the input shaft 17 through the clutch 950. The sun gear member 942 is selectively connectable with the input shaft 17 through the clutch 952. The sun gear member 922 is selectively connectable with the ring gear member 934 through the clutch 954. The sun gear member 922 is selectively connectable with the planet carrier assembly member 946 through the clutch 956. The planet carrier assembly member 926 is selectively connectable with the ring gear member 934 through the clutch 957. The planet carrier assembly member 926 is selectively connectable with the sun gear member 942 through the clutch 958. The planet carrier assembly member 946 is selectively connectable with the transmission housing 960 through the brake 959.

The truth table of FIG. 10b describes the torque-transmitting mechanism engagement sequence utilized to provide two reverse torque ratios and eight forward torque ratios. The truth table also provides a set of examples for the ratios for each of the reverse and forward torque ratios. These numerical values have been determined utilizing the ring gear/sun gear tooth ratios given in FIG. 10b. The $N_{R1}/N_{S1}$ value is the tooth ratio of the planetary gear set 920; the $N_{R2}/N_{S2}$ value is the tooth ratio of the planetary gear set 930; and the $N_{R3}/N_{S3}$ value is the tooth ratio of the planetary gear set 940.

Figures 11A, 11B:
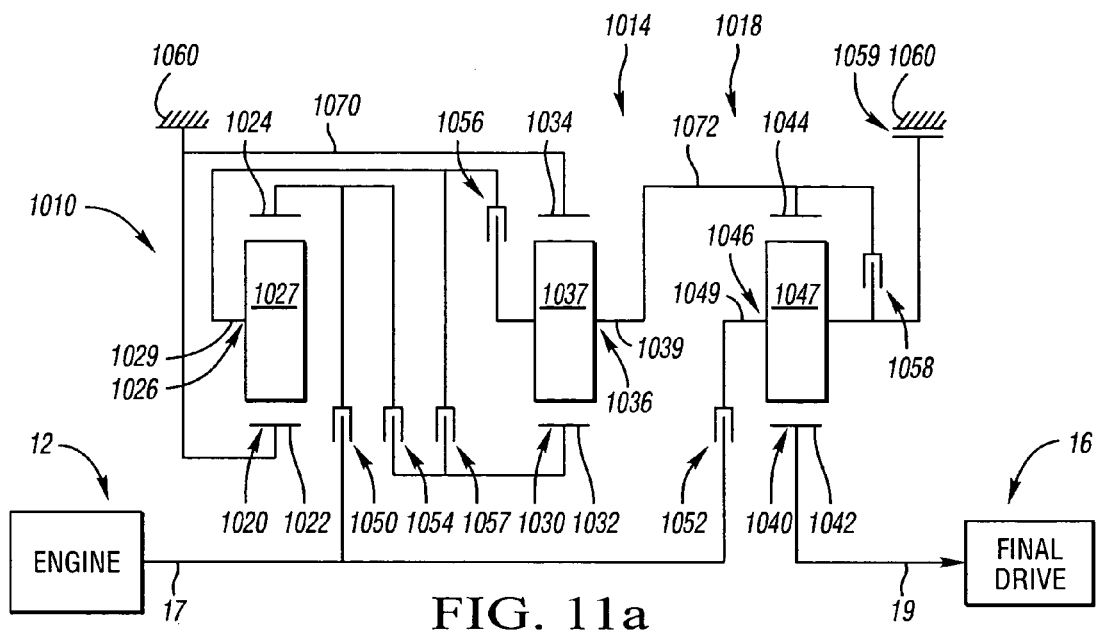

A powertrain 1010, shown in FIG. 11a, includes the conventional engine 12, a planetary transmission 1014, and the conventional final drive mechanism 16. The engine is drivingly connected with the planetary transmission 1014 through the input shaft 17. The planetary transmission 1014 is drivingly connected with the final drive mechanism 16 through the output shaft 19. The planetary transmission 1014 includes a planetary gear arrangement 1018 that has a first planetary gear set 1020, a second planetary gear set 1030, and a third planetary gear set 1040.

The planetary gear set 1020 includes a sun gear member 1022, a ring gear member 1024, and a planet carrier assembly 1026. The planet carrier assembly 1026 includes a plurality of pinion gears 1027 rotatably mounted on a carrier member 1029 and disposed in meshing relationship with both the sun gear member 1022 and the ring gear member 1024.

The planetary gear set 1030 includes a sun gear member 1032, a ring gear member 1034, and a planet carrier assembly member 1036. The planet carrier assembly member 1036 includes a plurality of pinion gears 1037 rotatably mounted on a carrier member 1039 and disposed in meshing relationship with both the ring gear member 1034 and the sun gear member 1032.

The planetary gear set 1040 includes a sun gear member 1042, a ring gear member 1044, and a planet carrier assembly member 1046. The planet carrier assembly member 1046 includes a plurality of pinion gears 1047 rotatably mounted on a carrier member 1049 and disposed in meshing relationship with both the ring gear member 1044 and the sun gear member 1042.

The planetary gear arrangement 1018 also includes seven torque-transmitting mechanisms 1050, 1052, 1054, 1056, 1057, 1058 and 1059. The torque-transmitting mechanisms 1050, 1052, 1054, 1056, 1057 and 1058 are rotating-type torque-transmitting mechanisms, commonly termed clutches. The torque-transmitting mechanism 1059 is a stationary-type torque-transmitting mechanism, commonly termed brake or reaction clutch.

The input shaft 17 is not continuously connected with any planetary gear member. The output shaft 19 is continuously connected with the sun gear member 1042. The sun gear member 1022 is continuously connected with the ring gear member 1034 and with the transmission housing 1060 through the interconnecting member 1070. The planet carrier assembly member 1036 is continuously connected with the ring gear member 1044 through the interconnecting member 1072.

The ring gear member 1024 is selectively connectable with the input shaft 17 through the clutch 1050. The planet carrier assembly member 1046 is selectively connectable with the input shaft 17 through the clutch 1052. The ring gear member 1024 is selectively connectable with the planet carrier assembly member 1036 through the clutch 1054. The planet carrier assembly member 1026 is selectively connectable with the sun gear member 1032 through the clutch 1056. The planet carrier assembly member 1026 is selectively connectable with the sun gear member 1032 through the clutch 1057. The ring gear member 1044 is selectively connectable with the planet carrier assembly member 1046 through the clutch 1058. The planet carrier assembly member 1046 is selectively connectable with the transmission housing 1060 through the brake 1059.

The truth table shown in FIG. 11b describes the engagement combinations and the engagement sequence necessary to provide three reverse drive ratios and eight forward torque ratios. A sample of the numerical values for the ratios is also provided in the truth table of FIG. 11b. These values are determined utilizing the ring gear/sun gear tooth ratios also given in FIG. 11b. The $N_{R1}/N_{S1}$ value is the tooth ratio for the planetary gear set 1020; the $N_{R2}/N_{S2}$ value is the tooth ratio for the planetary gear set 1030; and the $N_{R3}/N_{S3}$ value is the tooth ratio for the planetary gear set 1040. Also given in FIG. 11b is a chart describing the step ratios between the adjacent forward torque ratios and the reverse to first forward speed ratio.

Figures 12A, 12B:
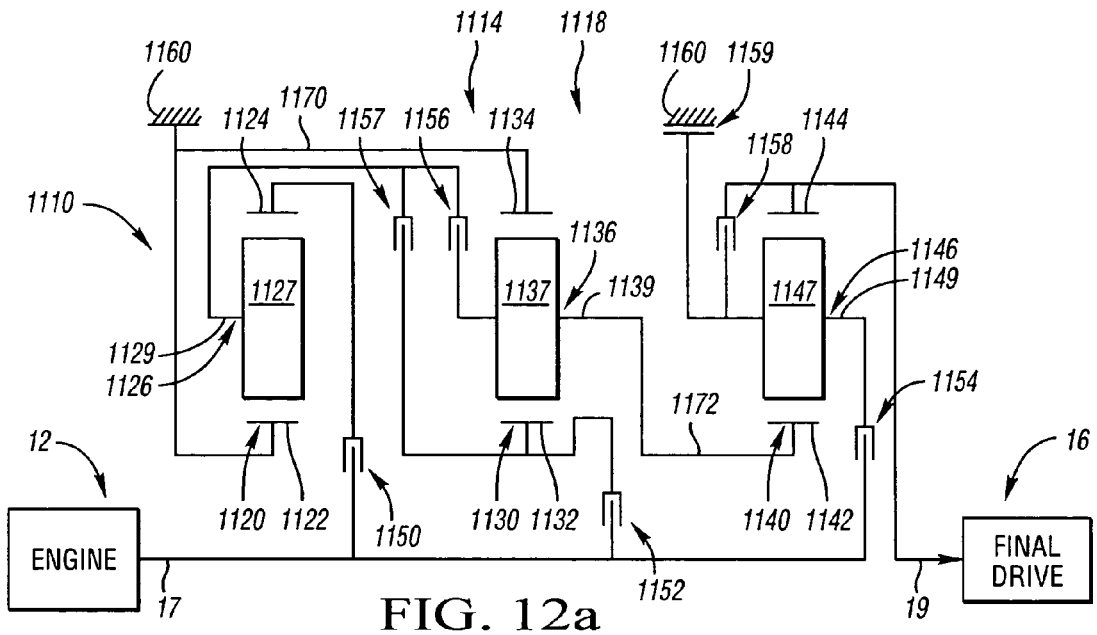

A powertrain 1110, shown in FIG. 12a, includes the conventional engine 12, a planetary transmission 1114, and the conventional final drive mechanism 16. The engine is drivingly connected with the planetary transmission 1114 through the input shaft 17. The planetary transmission 1114 is drivingly connected with the final drive mechanism 16 through the output shaft 19. The planetary transmission 1114 includes a planetary gear arrangement 1118 that has a first planetary gear set 1120, a second planetary gear set 1130, and a third planetary gear set 1140.

The planetary gear set 1120 includes a sun gear member 1122, a ring gear member 1124, and a planet carrier assembly member 1126. The planet carrier assembly member 1126 includes a plurality of pinion gears 1127 rotatably mounted on a carrier member 1129 and disposed in meshing relationship with both the sun gear member 1122 and the ring gear member 1124.

The planetary gear set 1130 includes a sun gear member 1132, a ring gear member 1134, and a planet carrier assembly member 1136. The planet carrier assembly member 1136 includes a plurality of pinion gears 1137 rotatably mounted on a carrier member 1139 and disposed in meshing relationship with both the sun gear member 1132 and the ring gear member 1134.

The planetary gear set 1140 includes a sun gear member 142, a ring gear member 1144, and a planet carrier assembly member 1146. The planet carrier assembly member 1146 includes a plurality of pinion gears 1147 rotatably mounted on a carrier member 1149 and disposed in meshing relationship with the ring gear member 1144 and the sun gear member 1142.

The planetary gear arrangement 1118 also includes seven torque-transmitting mechanisms 1150, 1152, 1154, 1156, 1157, 1158 and 1159. The torque-transmitting mechanisms 1150, 1152, 1154, 1156, 1157 and 1158 are rotating type torque-transmitting mechanisms, commonly termed clutches. The torque-transmitting mechanism 1159 is a stationary-type torque-transmitting mechanism, commonly termed brake or reaction clutch.

The input shaft 17 is not continuously connected with any planetary gear member. The output shaft 19 is continuously connected with the ring gear member 1144. The sun gear member 1122 is continuously connected with the ring gear member 1134 and with the transmission housing 1160 through the interconnecting member 1170. The planet carrier assembly member 1136 is continuously connected with the sun gear member 1142 through the interconnecting member 1172.

The ring gear member 1124 is selectively connectable with the input shaft 17 through the clutch 1150. The sun gear member 1132 is selectively connectable with the input shaft 17 through the clutch 1152. The planet carrier assembly member 1146 is selectively connectable with the input shaft 17 through the clutch 1154. The planet carrier assembly member 1126 is selectively connectable with the planet carrier assembly member 1136 through the clutch 1156. The planet carrier assembly member 1126 is selectively connectable with the sun gear member 1132 through the clutch 1157. The ring gear member 1144 is selectively connectable with the planet carrier assembly member 1146 through the clutch 1158. The planet carrier assembly member 1146 is selectively connectable with the transmission housing 1160 through the brake 1159.

The truth table shown in FIG. 12*b* describes the engagement combinations and the engagement sequence necessary to provide three reverse drive ratios and eight forward torque ratios. A sample of the numerical values for the ratios is also provided in the truth table of FIG. 12*b*. The values are determined utilizing the ring gear/sun gear tooth ratios also given in FIG. 12*b*. The $N_{R1}/S_{R1}$ value is the tooth ratio of the planetary gear set 1120; the $N_{R2}/S_{R2}$ value is the tooth ratio of the planetary gear set 1130; and the $N_{R3}/S_{R3}$ value is the tooth ratio of the planetary gear set 1140. Also given in FIG. 12*b* is a chart describing the step ratios between the adjacent forward torque ratios and the reverse to first forward speed ratio. For example, step ratio between the first and second forward torque ratios is 1.44.

Figures 13A, 13B:
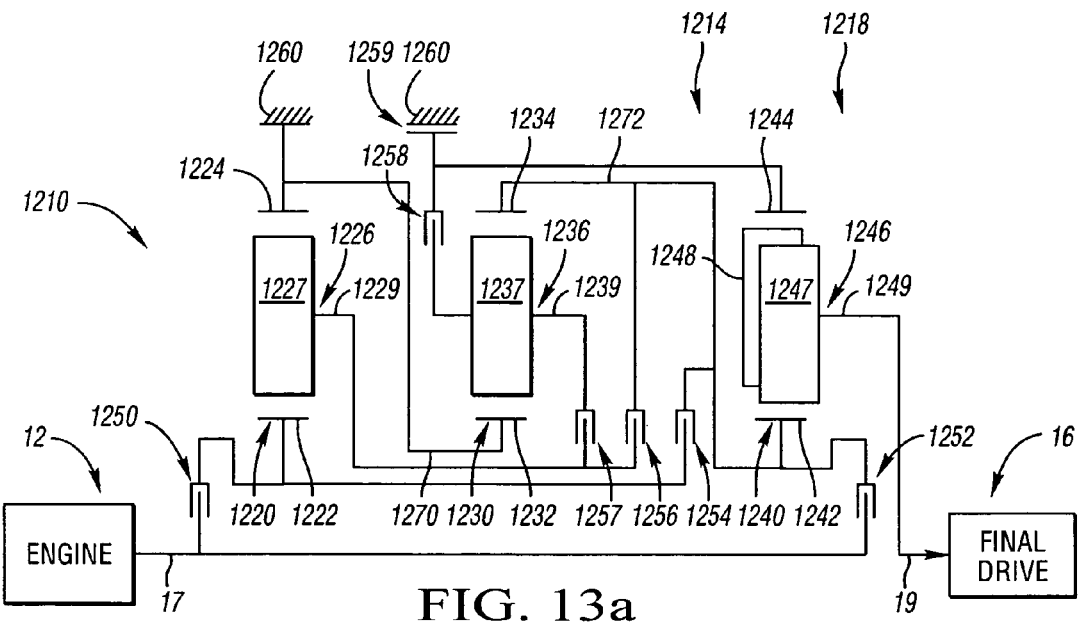

A powertrain 1210, shown in FIG. 13*a*, includes the conventional engine 12, a planetary transmission 1214, and the conventional final drive mechanism 16. The engine is drivingly connected with the planetary transmission 1214 through the input shaft 17. The planetary transmission 1214 is drivingly connected with the final drive mechanism 16 through the output shaft 19. The planetary transmission 1214 includes a planetary gear arrangement 1218 that has a first planetary gear set 1220, a second planetary gear set 1230, and a third planetary gear set 1240.

The planetary gear set 1220 includes a sun gear member 1222, a ring gear member 1224, and a planet carrier assembly member 1226. The planet carrier assembly member 1226 includes a plurality of pinion gears 1227 rotatably mounted on a carrier member 1229 and disposed in meshing relationship with both the ring gear member 1224 and the sun gear member 1222.

The planetary gear set 1230 includes a sun gear member 1232, a ring gear member 1234, and a planet carrier assembly member 1236. The planet carrier assembly member 1236 includes a plurality of pinion gears 1237 rotatably mounted on a carrier member 1239 and disposed in meshing relationship with the ring gear member 1234 and the sun gear member 1232.

The planetary gear set 1240 includes a sun gear member 1242, a ring gear member 1244, and a planet carrier assembly member 1246. The planet carrier assembly member 1246 includes a plurality of pinion gears 1247, 1248 rotatably mounted on a carrier member 1249 and disposed in meshing relationship with the sun gear member 1242 and the ring gear member 1244, respectively.

The planetary gear arrangement 1218 also includes seven torque-transmitting mechanisms 1250, 1252, 1254, 1256, 1257, 1258 and 1259. The torque-transmitting mechanisms 1250, 1252, 1254, 1256, 1257 and 1258 are rotating type torque-transmitting mechanisms, commonly termed clutches. The torque-transmitting mechanism 1259 is a stationary type torque-transmitting mechanism, commonly termed a brake or reaction clutch.

The input shaft 17 is not continuously connected with any planetary gear member. The output shaft 19 is continuously connected with the planet carrier assembly member 1246. The ring gear member 1224 is continuously connected with the sun gear member 1232 and with the transmission housing 1260 through the interconnecting member 1270. The ring gear member 1234 is continuously connected with the sun gear member 1242 through the interconnecting member 1272.

The sun gear member 1222 is selectively connectable with the input shaft 17 through the clutch 1250. The sun gear member 1242 is selectively connectable with the input shaft 17 through the clutch 1252. The sun gear member 1242 is selectively connectable with the sun gear member 1222 through the clutch 1254. The planet carrier assembly member 1226 is selectively connectable with the ring gear member 1234 through the clutch 1256. The planet carrier assembly member 1226 is selectively connectable with the planet carrier assembly member 1236 through the clutch 1257. The planet carrier assembly member 1236 is selectively connectable with the ring gear member 1244 through the clutch 1258. The ring gear member 1244 is selectively connectable with the transmission housing 1260 through the brake 1259.

The truth table shown in FIG. 13*b* describes the engagement combinations and the engagement sequence necessary to provide three reverse drive ratios and eight forward torque ratios. A sample of the numerical values for the ratios is also provided in the truth table of FIG. 13*b*. These values are determined utilizing the ring gear/sun gear tooth ratios also given in FIG. 13*b*. The $N_{R1}/S_{R1}$ value is the tooth ratio of the planetary gear set 1220; the $N_{R2}/S_{R2}$ value is the tooth ratio of the planetary gear set 1230; and the $N_{R3}/S_{R3}$ value is the tooth ratio of the planetary gear set 1240. Also given in FIG. 13*b* is a chart describing the step ratios between the adjacent forward torque ratios and the reverse to first forward speed ratio.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
   an input shaft;
   an output shaft;
   first, second and third planetary gear sets each having first, second and third members;
   said output shaft being continuously interconnected with a member of said planetary gear sets, and said input shaft not being continuously interconnected with any member of said planetary gear sets;
   a first interconnecting member continuously interconnecting said first member of said first planetary gear set with said first member of said second planetary gear set and with a stationary member;
a second interconnecting member continuously interconnecting said second member of said second planetary gear set with said first member of said third planetary gear set;
a first torque-transmitting mechanism selectively interconnecting a member of said first or third planetary gear set with said input shaft;
a second torque-transmitting mechanism selectively interconnecting a member of said second or third planetary gear set with said input shaft;
a third torque-transmitting mechanism selectively interconnecting a member of said first, second or third planetary gear set with said input shaft or with another member of said first, second or third planetary gear set;
a fourth torque-transmitting mechanism selectively interconnecting a member of said first planetary gear set with a member of said second or third planetary gear set;
a fifth torque-transmitting mechanism selectively interconnecting a member of said second planetary gear set with a member of said first or third planetary gear set;
a sixth torque-transmitting mechanism selectively interconnecting a member of said first, second or third planetary gear set with another member of said first, second or third planetary gear set;
a seventh torque-transmitting mechanism selectively interconnecting a member of said first, second or third planetary gear set with another member of said first, second or third planetary gear set, or with said stationary member;
said torque-transmitting mechanisms being engaged in combinations of three to establish at least eight forward torque ratios and at least one reverse speed ratio between said input shaft and said output shaft.

2. The transmission defined in claim 1, wherein said first, second, third, fourth, fifth and sixth torque-transmitting mechanisms comprise clutches, and said seventh torque-transmitting mechanism comprises a brake.

3. The transmission defined in claim 1, wherein said first, second, third, fourth, fifth, sixth and seventh torque-transmitting mechanisms comprise clutches.

4. The transmission defined in claim 1, wherein planet carrier assembly members of each of said planetary gear sets are single-pinion carriers.

5. The transmission defined in claim 1, wherein at least one planet carrier assembly member of said planetary gear sets is a double-pinion carrier.

6. A multi-speed transmission comprising:
an input shaft;
an output shaft;
a planetary gear arrangement having first, second and third planetary gear sets, each planetary gear set having first, second and third members;
said output shaft being continuously interconnected with a member of said planetary gear sets, and said input shaft not being continuously interconnected with any member of said planetary gear sets;
a first interconnecting member continuously interconnecting said first member of said first planetary gear set with said first member of said second planetary gear set and with a stationary member;
a second interconnecting member continuously interconnecting said second member of said second planetary gear set with said first member of said third planetary gear set; and
seven torque-transmitting mechanisms for selectively interconnecting said members of said planetary gear sets with said input shaft, with said stationary member or with other members of said planetary gear sets, said seven torque-transmitting mechanisms being engaged in combinations of three to establish at least eight forward torque ratios and at least one reverse speed ratio between said input shaft and said output shaft.

7. The transmission defined in claim 6, wherein a first of said seven torque-transmitting mechanisms is operable for selectively interconnecting a member of said first or third planetary gear set with said input shaft.

8. The transmission defined in claim 6, wherein a second of said seven torque-transmitting mechanisms is operable for selectively interconnecting a member of said second or third planetary gear set with said input shaft.

9. The transmission defined in claim 6, wherein a third of said seven torque-transmitting mechanisms is selectively operable for interconnecting a member of said first, second or third planetary gear set with said input shaft or with another member of said first, second or third planetary gear set.

10. The transmission defined in claim 6, wherein a fourth of said seven torque-transmitting mechanisms is selectively operable for interconnecting a member of said first planetary gear set with a member of said second or third planetary gear set.

11. The transmission defined in claim 6, wherein a fifth of said seven torque-transmitting mechanisms is selectively operable for interconnecting a member of said second planetary gear set with a member of said first or third planetary gear set.

12. The transmission defined in claim 6, wherein a sixth of said seven torque-transmitting mechanisms selectively interconnects a member of said first, second or third planetary gear set with another member of said first, second or third planetary gear set.

13. The transmission defined in claim 6, wherein a seventh of said seven torque-transmitting mechanisms selectively interconnects a member of said first, second or third planetary gear set with another member of said first, second or third planetary gear set, or with said stationary member.

14. The transmission defined in claim 6, wherein planet carrier assembly members of each of said planetary gear sets are single-pinion carriers.

15. The transmission defined in claim 6, wherein at least one planet carrier assembly member of said planetary gear sets is a double-pinion carrier.

* * * * *